United States Patent
Fushimi et al.

(10) Patent No.: US 7,290,212 B2
(45) Date of Patent: Oct. 30, 2007

(54) PROGRAM AND METHOD FOR DISPLAYING A RADAR CHART

(75) Inventors: Toshihiko Fushimi, Kanagawa (JP); Koichi Tsuzuki, Kanagawa (JP); Hisayo Yamamoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 10/671,600

(22) Filed: Sep. 29, 2003

(65) Prior Publication Data
US 2004/0070624 A1   Apr. 15, 2004

Related U.S. Application Data

(63) Continuation of application No. PCT/JP02/02730, filed on Mar. 20, 2002.

(30) Foreign Application Priority Data

Mar. 30, 2001   (JP)   ............... 2001-100632

(51) Int. Cl.
G06F 3/00   (2006.01)

(52) U.S. Cl. ............ 715/731; 715/700; 715/771; 715/790; 345/440; 345/440.2; 382/113

(58) Field of Classification Search ............... 345/440, 345/440.2; 715/790, 771, 700, 731; 706/919; 705/23; 700/95; 382/113

See application file for complete search history.

(56) References Cited

U.S. PATENT DOCUMENTS

| | | | | | |
|---|---|---|---|---|---|
| 5,461,708 | A | * | 10/1995 | Kahn | 345/440 |
| 5,596,703 | A | * | 1/1997 | Eick et al. | 715/700 |
| 5,764,239 | A | * | 6/1998 | Misue et al. | 345/440 |
| 2002/0032037 | A1 | * | 3/2002 | Segawa | 455/517 |

OTHER PUBLICATIONS

Julia Kelly, Using Microsoft Excel 2000, 1999, Que, pp. 564-565, 385, 387-388,393-395, 405,422-423.*
English Language Abstract Japanese Patent Application No. 09-134440 dated May 20, 1997.
English Language Abstract Japanese Patent Application No. 11-096185 dated Sep. 4, 1999.
English Language Abstract Japanese Patent Application No. 2000-036054 dated Feb. 2, 2000.

* cited by examiner

*Primary Examiner*—Weilun Lo
*Assistant Examiner*—TuyetLien Tran
(74) *Attorney, Agent, or Firm*—Staas & Halsey LLP

(57) ABSTRACT

With spreadsheet software, such as the MICROSOFT EXCEL, a radar chart can be compiled by the use of data in a table made.

12 Claims, 20 Drawing Sheets

| EVALUATION ITEM \ NAME OF MANUFACTURER | F COMPANY | N COMPANY | I COMPANY | H COMPANY | T COMPANY |
|---|---|---|---|---|---|
| PRICE | 8 | 5 | 7 | 8 | 3 |

| EVALUATION ITEM \ NAME OF MANUFACTURER | F COMPANY | N COMPANY | I COMPANY | H COMPANY | T COMPANY |
|---|---|---|---|---|---|
| PRICE | 8 | 5 | 7 | 8 | 3 |
| FUNCTION | 7 | 4 | 9 | 6 | 5 |
| SUPPORT | 10 | 8 | 6 | 9 | 7 |
| EXPANDABILITY | 6 | 9 | 10 | 5 | 9 |
| DESIGN | 5 | 10 | 9 | 7 | 9 |
| PORTABILITY | 7 | 8 | 9 | 6 | 10 |

FIG. 9

43 TEXT DATA

| MANUFACTURER | OPINION |
|---|---|
| A COMPANY | COMPUTERS ARE USER-FRIENDLY |
| B COMPANY | A SUPPORT SETUP IS COMPLETE |
| C COMPANY | THERE ARE MANY PIECES OF PRE-INSTALLED SOFTWARE |
| A COMPANY | DESIGNS ARE GOOD |
| ⋮ | ⋮ |

FIG. 16

| ALGORITHM | SPRING CHARACTERISTIC | | FEATURE | CHARACTERISTIC |
| --- | --- | --- | --- | --- |
| | STRENGTH ($C_s$) | NATURAL LENGTH($d_0$) | | |
| 1-1 | CONSTANT | CONSTANT | HAS THE SAME CHARACTERISTICS AS THE EADES SPRING MODEL. THE DEGREE OF ASSOCIATION CAN BE SHOWN BY THE THICKNESS OF A RELATIONAL LINE. | AN ARRANGEMENT MAP TENDS TO SPREAD. |
| 1-R | DEGREE OF ASSOCIATION | CONSTANT | A STRONGER FORCE WILL ACT BETWEEN KEYWORDS BETWEEN WHICH THE DEGREE OF ASSOCIATION IS HIGHER. THE SPREAD OF AN ARRANGEMENT MAP IS RESTRAINED SLIGHTLY. | IF SIMILAR RELATIONSHIPS EXIST AMONG MANY KEYWORDS, THEY TEND TO GATHER IN THE CENTER. |
| R-R | DEGREE OF ASSOCIATION | 1/DEGREE OF ASSOCIATION | A STRONGER FORCE WILL ACT BETWEEN KEYWORDS BETWEEN WHICH THE DEGREE OF ASSOCIATION IS HIGHER. THE SPREAD OF AN ARRANGEMENT MAP IS RESTRAINED SLIGHTLY AND KEYWORDS HAVE A STRONG TENDENCY TO FORM A CLUSTER. | IF SIMILAR RELATIONSHIPS EXIST AMONG MANY KEYWORDS, THEY GATHER IN THE CENTER. |

FIG. 18

PROGRAM AND METHOD FOR DISPLAYING A RADAR CHART

This application is a continuing application, filed under 35 U.S.C. §111(a), of International Application PCT/JP02/02730, filed Mar. 20, 2002, it being further noted that priority is based upon Japanese Patent Application No. 2001-100632, filed Mar. 30, 2001.

BACKGROUND OF THE INVENTION (1) Field of the Invention

This invention relates to a program and method for displaying a radar chart and, more particularly, to a program and method for displaying a radar chart regarding a plurality of items.

(2) Description of the Related Art

Now various pieces of data including statistical data are processed by a computer to make graphs, such as radar charts, or tables. With a radar chart, statistical variables are assigned to the vertices of a polygon and an axis for each variable is set on a line segment which connects the center of the polygon and each vertex. A point indicative of the value of each variable is arranged on each axis and a broken line which passes each point is displayed. By using such a radar chart, the properties of an object of analysis can be shown plainly.

With spreadsheet software, such as the Microsoft Excel, a radar chart can be compiled by the use of data in a table made.

Radar charts which have been used are useful for indicating the statistical properties of an item, but it is difficult to use them for comparing the statistical properties of a plurality of items.

If there are a plurality of items, a broken line corresponding to each item can be displayed on one radar chart.

FIG. 19 is a view showing an example of a radar chart on which a plurality of broken lines are displayed. On a radar chart 300 shown in FIG. 19, broken lines 311 through 316 corresponding to the six items "Price," "Function," "Support," "Expandability," "Design," and "Portability" respectively are displayed. If the plurality of broken lines 311 through 316 are displayed on the radar chart 300 in this way, they will overlap one another, resulting in poor visibility.

Moreover, a plurality of radar charts corresponding to each item can also be displayed individually.

FIG. 20 is a view showing an example of a screen on which a plurality of radar charts are displayed. In FIG. 20, radar charts 321 through 326 corresponding to the six items "Price," "Function," "Support," "Expandability," "Design," and "Portability" respectively are displayed on a screen 320. If the plurality of radar charts 321 through 326 are displayed on the screen 320 in this way, the visibility of each broken line can be ensured. However, it is difficult to compare items in detail.

SUMMARY OF THE INVENTION

The present invention was made under the background circumstances as described above. An object of the present invention is to provide a program and method for displaying a radar chart which shows good visibility regardless of the number of items displayed.

In order to achieve the above object, a program for displaying a radar chart on the screen of a display unit is provided. This program causes a computer to perform the processes of judging a degree of association between each of a plurality of axial labels and at least one arranged keyword on the basis of data indicative of the relationship between each of the plurality of axial labels and the arranged keyword, assigning the plurality of axial labels to a plurality of axes on a radar chart and setting a reference point for the assigned axial label on each of the plurality of axes, setting a display position for the arranged keyword at a location nearer to a reference point for an axial label the degree of association of which with the arranged keyword is relatively high than to a reference point for an axial label the degree of association of which with the arranged keyword is relatively low, and displaying an image indicative of the arranged keyword at the determined display position on the radar chart.

Furthermore, in order to achieve the above object, a method for displaying a radar chart on a computer screen is provided. This method for displaying a radar chart comprises the steps of judging a degree of association between each of a plurality of axial labels and at least one arranged keyword on the basis of data indicative of the relationship between each of the plurality of axial labels and the arranged keyword, assigning the plurality of axial labels to a plurality of axes on a radar chart and setting a reference point for the assigned axial label on each of the plurality of axes, setting a display position for the arranged keyword at a location nearer to a reference point for an axial label the degree of association of which with the arranged keyword is relatively high than to a reference point for an axial label the degree of association of which with the arranged keyword is relatively low, and displaying an image indicative of the arranged keyword at the display position set on the radar chart.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a view showing a first example of tabular data input.

FIG. 9 is a view showing a second example of tabular data input.

FIG. 16 is a view showing an example of text data input.

FIG. 18 is a view showing the relationship between an algorithm and coefficients.

DESCRIPTION OF THE PREFERRED EMBODIMENTS

Embodiments of the present invention will now be described with reference to the drawings.

Figure 1:
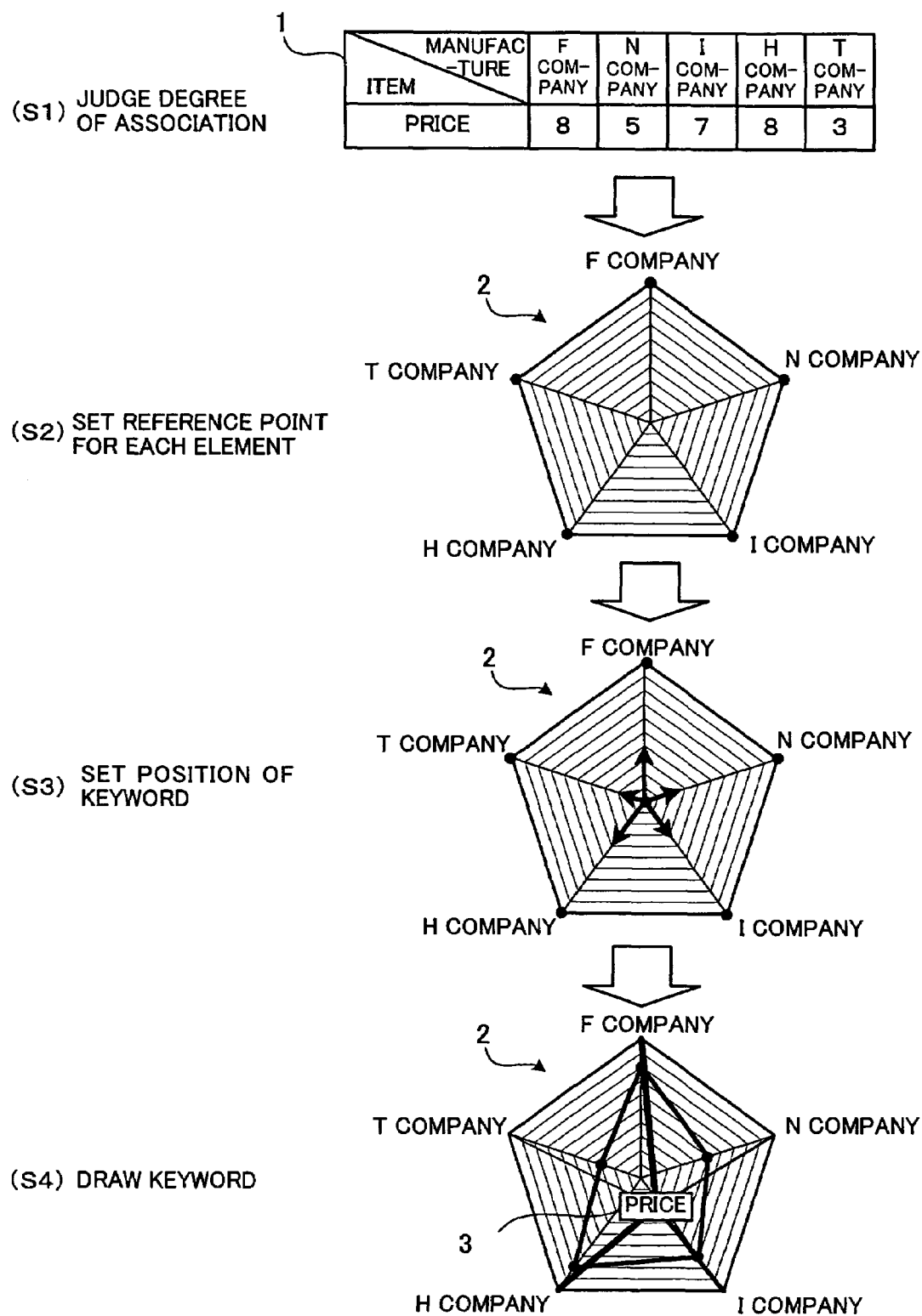
FIG. 1 is a view for describing the principles underlying the present invention.

FIG. 1 is a view for describing the principles underlying the present invention. In the present invention, the degree of association between each of a plurality of axial labels and at least one arranged keyword is judged on the basis of data 1 indicative of the relationship between each of the plurality of axial labels and the arranged keyword (step S1). The data 1 is, for example, tabular data including one row or more and a plurality of columns. In this example, a numeric value at a location where keywords in a row and a column in the data 1 put into tabular form intersect is the degree of association between these keywords.

Next, the plurality of axial labels are assigned to a plurality of axes on a radar chart 2 and a reference point for an assigned axial label is set on each of the plurality of axes (step S2). For example, if there are five axial labels, then the five vertices of a pentagonal radar chart are reference points for the axial labels.

Then a display position for the arranged keyword is set at a location nearer to a reference point for an axial label the degree of association of which with the arranged keyword is relatively high than to a reference point for an axial label the degree of association of which with the arranged keyword is relatively low (step S3). For example, a spring force is defined according to the degree of association between an axial label and an arranged keyword. This spring force will act in the direction of a reference point for each axial label. It is assumed that a spring force set for each axial label acts at an arbitrary position on the radar chart 2. On the radar chart 2, the location where the resultant force of all forces becomes zero is set as a display position for the arranged keyword. The process of arranging keywords according to the relationship between them in this way is called concept mapping.

Finally, an image 3 indicative of the arranged keyword is displayed at the display position set on the radar chart 2 (step S4).

As a result, a display position for the arranged keyword is determined on the basis of the relationships between the axial labels and the arranged keyword shown in the data 1 and the image 3 indicative of the arranged keyword is displayed at a location on the radar chart near to a reference point for an axial label the degree of association of which with the arranged keyword is high. By checking the position where the image 3 indicative of the arranged keyword is displayed, an axial label the degree of association of which with the arranged keyword is high can be judged easily.

A spring force is produced by a spring virtually set. As the distance between an arranged keyword and a reference point for an axial label increases, the pull of a spring becomes strong. Reference length (natural length) is set for a spring. When the length of a spring becomes shorter than the natural length, a force (repulsive force) to move an arranged keyword away from a reference point for an axial label occurs in it.

Now, first and second embodiments of the present invention will be described. In the first embodiment, a radar chart will be made on the basis of tabular data specified by, for example, operation input. In the second embodiment, statistical data will be generated on the basis of text data obtained by, for example, a questionnaire and a radar chart which shows a statistical trend will be made.

First Embodiment

A case where a process in the first embodiment of the present invention is performed by a computer will be described concretely.

Figure 2:
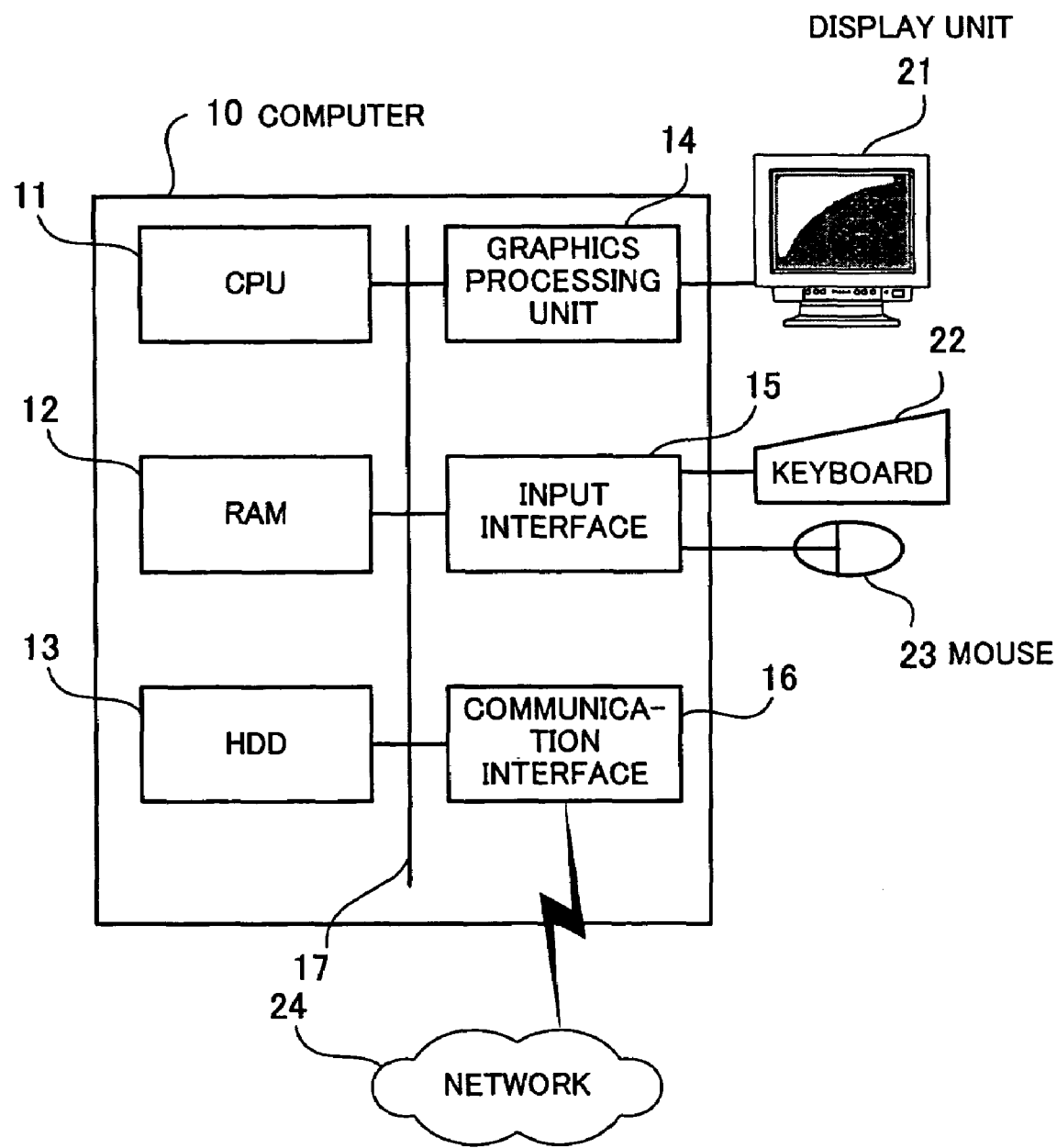
FIG. 2 is a view showing an example of the configuration of computer hardware used in embodiments of the present invention.

FIG. 2 is a view showing an example of the configuration of computer hardware used in the embodiments of the present invention. The whole of a computer 10 is controlled by a CPU 11. A RAM 12, a hard disk drive (HDD) 13, a graphics processing unit 14, an input interface 15, and a communication interface 16 are connected to the CPU 11 via a bus 17.

The RAM 12 temporarily stores at least part of an operating system (OS) program or an application program executed by the CPU 11. The RAM 12 also stores various pieces of data necessary for processing by the CPU 11. The HDD 13 stores an OS and a radar chart display control program.

A display unit 21 is connected to the graphics processing unit 14. The graphics processing unit 14 displays an image, such as a CAD drawing, on a screen of the display unit 21 in compliance with instructions from the CPU 11. A keyboard 22 and a mouse 23 are connected to the input interface 15. The input interface 15 sends a signal sent from the keyboard 22 or the mouse 23 to the CPU 11 via the bus 17.

The communication interface 16 is connected to a network 24. The network 24 is a wide area network, such as the Internet. The communication interface 16 exchanges data with another computer via the network 24.

Executing a radar chart display program according to the embodiment of the present invention by the computer shown in FIG. 2 enables the computer to function as a radar chart display control unit.

Figure 3:
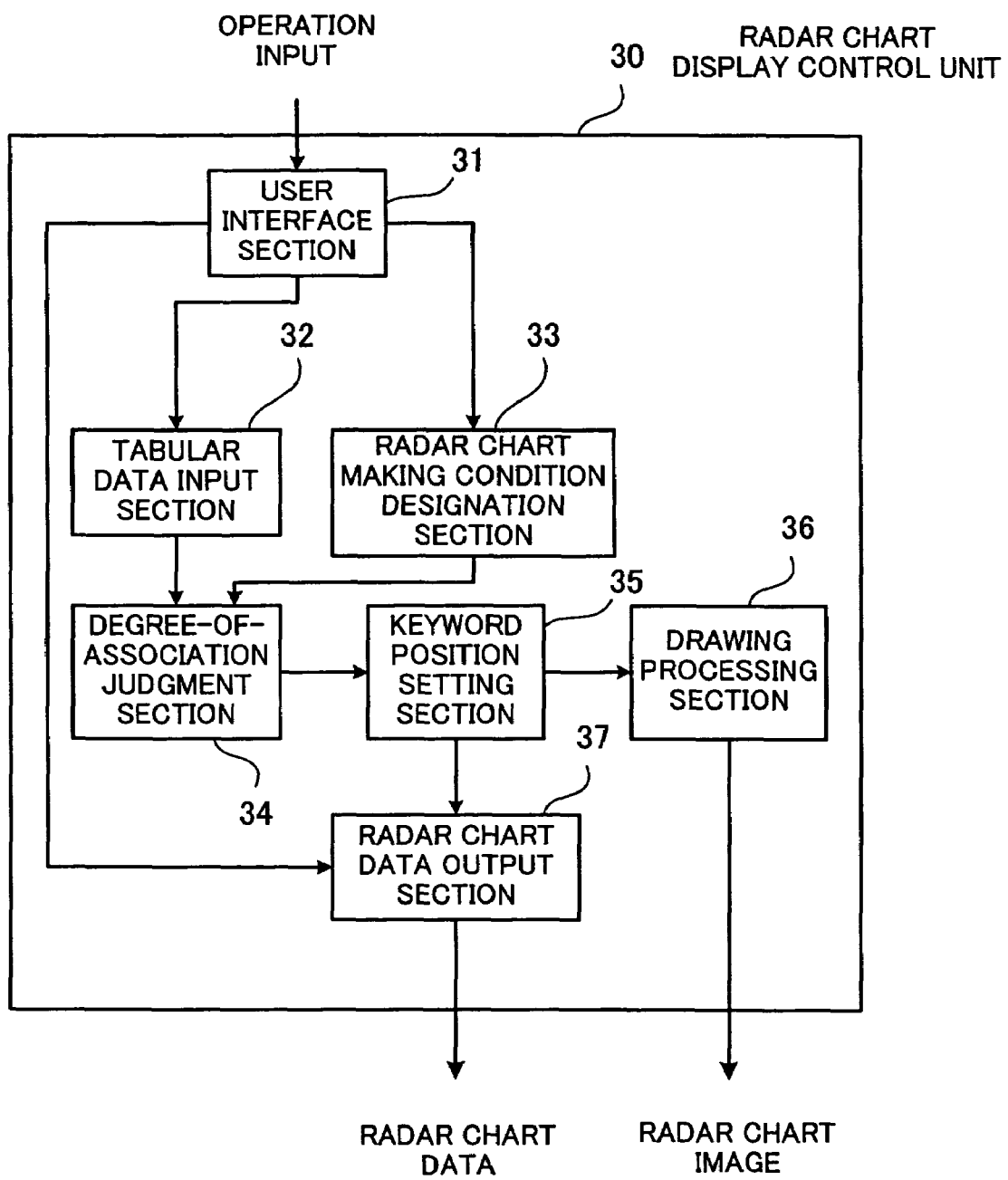
FIG. 3 is a block diagram showing the processing function of a radar chart display control unit.

FIG. 3 is a block diagram showing the processing function of a radar chart display control unit. A radar chart display control unit 30 comprises a user interface section 31, a tabular data input section 32, a radar chart making condition designation section 33, a degree-of-association judgment section 34, a keyword position setting section 35, a drawing processing section 36, and a radar chart data output section 37.

The user interface section 31 accepts a signal corresponding to operation input from an input device, such as the keyboard 22 or the mouse 23, and informs the tabular data input section 32, the radar chart making condition designation section 33, the radar chart data output section 37, etc. about the contents of instructions corresponding to the operation input. If instructions to terminate the process of making a radar chart are given from a user by operation input, then the user interface section 31 stops the processing function of the radar chart display control unit 30.

The tabular data input section 32 obtains tabular data in compliance with instructions from the user interface section 31. The tabular data input section 32 obtains data registered with, for example, a table including one row or more and a plurality of columns. A table may include a plurality of rows and one column or more. A keyword is set in each row and column in a table.

For example, the tabular data input section 32 receives tabular data values input and makes a data table in tabular form. The tabular data input section 32 can also accept the designation of a data table which has already been stored in, for example, the HDD 13 and obtain the data table from the HDD 13. The tabular data input section 32 passes tabular data it obtained to the degree-of-association judgment section 34.

The radar chart making condition designation section 33 determines radar chart making conditions in compliance with instructions from the user interface section 31. The radar chart making condition designation section 33 informs the degree-of-association judgment section 34 about making conditions it determined. These making conditions include the designation of keywords (axial labels) set for axes on a radar chart. For example, the radar chart making condition designation section 33 makes a user select rows or columns in a tabular data and uses a plurality of keywords set in the selected rows or columns as axial labels. Moreover, the radar chart making condition designation section 33 determines keywords (arranged keywords) to be displayed on a radar chart in response to operation input from a user. The degree-of-association judgment section 34 is informed about the arranged keywords the radar chart making condition designation section 33 determined.

The degree-of-association judgment section 34 recognizes keywords to be used as axial labels and arranged keywords among keywords set in rows or columns in a tabular data by notification from the radar chart making condition designation section 33. If arranged keywords are not designated, then all the keywords except axial labels may be treated as arranged keywords. In the first embodiment, a display position for each determined axial label will be fixed at an arbitrary location on an axis (at the maximum value of a scale on an axis, for example) on a radar chart.

The degree-of-association judgment section 34 analyzes tabular data input from the tabular data input section 32 to judge the degree of association between an axial label and an arranged keyword. For example, a numeric value set at a location where a keyword set in a row and a keyword set in a column intersect may be considered as the degree of association between the two keywords. The degree of association between an axial label and an arranged keyword is passed to the keyword position setting section 35.

The keyword position setting section 35 sets a position on a radar chart for each arranged keyword on the basis of data regarding the degree of association it received from the degree-of-association judgment section 34. A location nearer with the center of a radar chart as a reference to an axial label the degree of association of which is high than to an axial label the degree of association of which is low will be set as the position of an arranged keyword.

For example, it is assumed that there are virtual springs each of which connects an arranged keyword and an axial label. The keyword position setting section 35 sets a location where spring forces are balanced as the position of the arranged keyword. A spring force acting on the arranged keyword is expressed by a force vector which has the direction of a straight line which connects the arranged keyword and each axial label. As the degree of association between an arranged keyword and an axial label increases, the absolute value of a spring force becomes greater. In addition, as the degree of association between an arranged keyword and an axial label decreases, the absolute value of a spring force becomes smaller. A spring force may be defined in conformity with the Hooke's law. Alternatively, a spring force not based on the Hooke's law may be defined. If a spring force is defined in conformity with the Hooke's law, the distance between an axial label and an arranged keyword is considered the length of a spring, the degree of association between an axial label and the arranged keyword is considered a spring constant, and so on.

If a radar chart is expressed by a broken line, the keyword position setting section 35 may set the center of gravity of a polygon enclosed by the broken line as a position for an arranged keyword. A position set for an arranged keyword is passed to the drawing processing section 36.

The drawing processing section 36 draws the outer frame of a radar chart and draws a word corresponding to the appropriate arranged keyword at a position on the radar chart for each arranged keyword set by the keyword position setting section 35. An image of the radar chart drawn by the drawing processing section 36 is displayed on the screen of the display unit 21. The drawing processing section 36 can display a broken line indicative of the degree of association between an arranged keyword and an axial label on the radar chart. Moreover, the drawing processing section 36 can draw an additional line which passes the same values on axes.

The radar chart data output section 37 generates data (radar chart data), by which the contents of a displayed radar chart can be reproduced, in accordance with instructions from the user interface section 31 and outputs it. This radar chart data includes positions on a radar chart for keywords calculated by the keyword position setting section 35. Radar chart data will be output to a storage device, such as the HDD 13. The radar chart data output section 37 can output radar chart data in the comma separated value (CSV) format.

A process in the first embodiment performed by the use of the radar chart display control unit 30 having the above structure will now be described.

Figure 4:
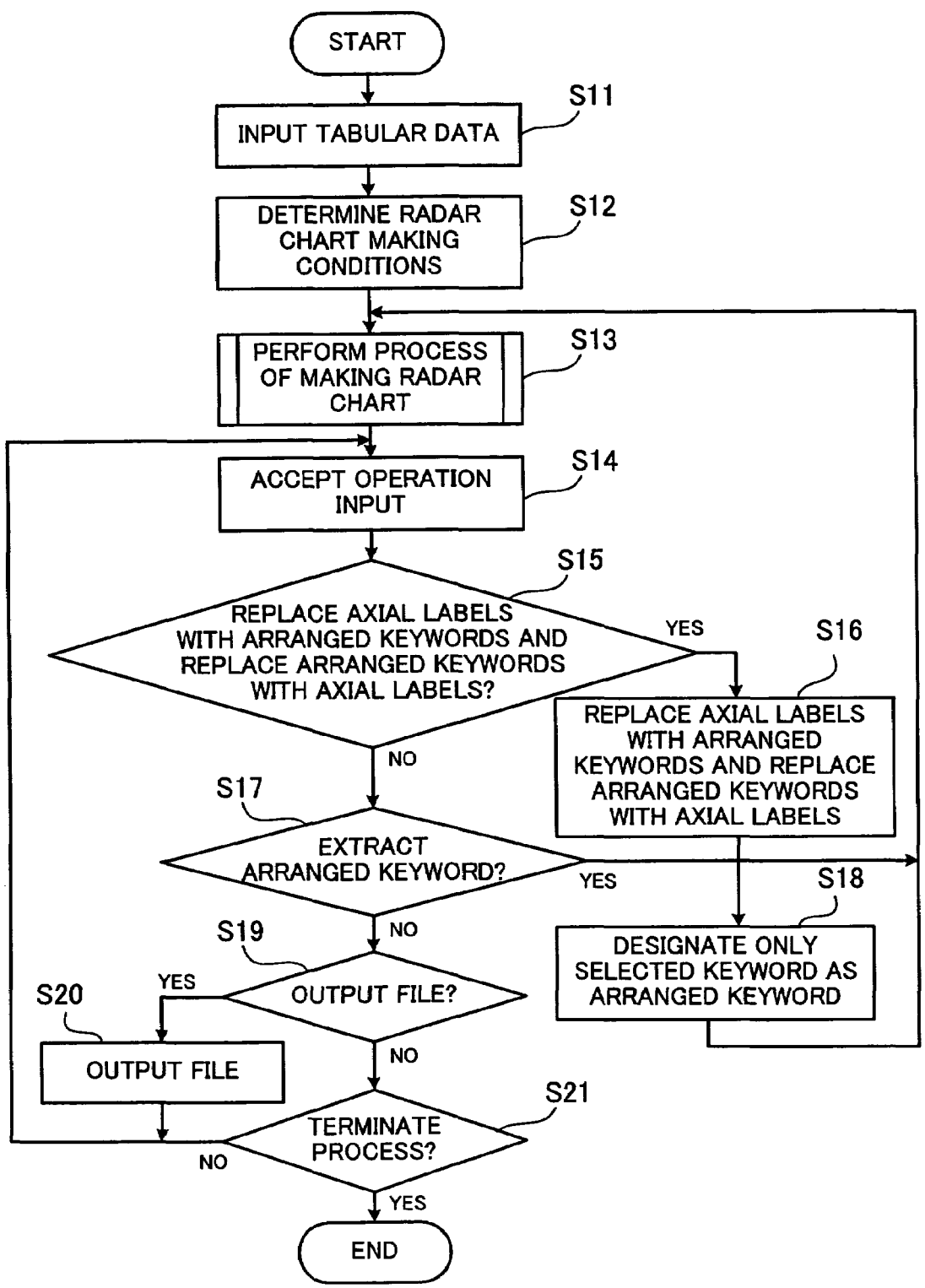
FIG. 4 is a flow chart showing a radar chart display process in a first embodiment.

FIG. 4 is a flow chart showing a radar chart display process in the first embodiment. The process shown in FIG. 4 will now be described in order of step number.

[Step S11] The tabular data input section 32 determines tabular data on the basis of which a radar chart will be made in response to operation input provided to the user interface section 31. The tabular data input section 32 inputs the tabular data it determined to the degree-of-association judgment section 34. For example, the user interface section 31 makes a user select a plurality of cells from a spreadsheet software screen. Then the tabular data input section 32 inputs tabular data including the selected cells to the degree-of-association judgment section 34.

[Step S12] The radar chart making condition designation section 33 determines radar chart making conditions in response to the operation input provided to the user interface section 31. These radar chart making conditions include the designation of axial labels, the designation of arranged keywords, etc. The radar chart making condition designation section 33 informs the degree-of-association judgment section 34 about the radar chart making conditions it determined.

[Step S13] The degree-of-association judgment section 34, the keyword position setting section 35, and the drawing processing section 36 perform the process of making a radar chart in conformity with the radar chart making conditions. As a result, a radar chart will be displayed on the screen of the display unit 21. The details of the process of making a radar chart will be described later.

[Step S14] The user interface section 31 accepts operation input from a user. The user interface section 31 informs the radar chart making condition designation section 33 or the radar chart data output section 37 about the contents of instructions corresponding to the operation input.

[Step S15] The radar chart making condition designation section 33 judges whether the operation input the user interface section 31 accepted in step S14 is an instruction to replace axial labels with arranged keywords and to replace the arranged keywords with the axial labels. If such an instruction is given by the operation input, then step S16 will be performed. If such an instruction is not given by the operation input, then step S17 will be performed.

[Step S16] The radar chart making condition designation section 33 designates the arranged keywords in place of the axial labels, designates the axial labels in place of the arranged keywords, and informs the degree-of-association judgment section 34 about the new radar chart making conditions. That is to say, the radar chart making condition designation section 33 informs the degree-of-association judgment section 34 that the keywords designated as axial labels when the radar chart being displayed was made should be used as arranged keywords and that the keywords designated as arranged keywords when the radar chart being displayed was made should be used as axial labels. Then step S13 will be performed.

[Step S17] The radar chart making condition designation section 33 judges whether the operation input the user interface section 31 accepted in step S14 is an instruction to extract an arranged keyword. Such an instruction will be given for designating the image of a keyword being displayed on the radar chart and for making a radar chart on which only that keyword is displayed as an arranged keyword. If the operation input is an instruction to extract an arranged keyword, then step S18 will be performed. If the operation input is not an instruction to extract an arranged keyword, then step S19 will be performed.

[Step S18] The radar chart making condition designation section 33 informs the degree-of-association judgment section 34 about conditions for making a radar chart on which only the keyword selected in accordance with the instruction to extract an arranged keyword is designated as an arranged keyword. Except for the designation of an arranged keyword, these conditions are the same as those used for making the original radar chart. Then step S13 will be performed.

[Step S19] The radar chart data output section 37 judges whether the operation input the user interface section 31 accepted in step S14 is an instruction to output a file. If the operation input is an instruction to output a file, then step S20 will be performed. If the operation input is not an instruction to output a file, then step S21 will be performed.

[Step S20] The radar chart data output section 37 outputs a file indicative of the positions of arranged keywords calculated by the keyword position setting section 35, the positions of axial labels, etc. Then step S14 will be performed.

[Step S21] The user interface section 31 judges whether the operation input it accepted in step S14 is an instruction to terminate the process of making a radar chart. If the operation input is an instruction to terminate the process of making a radar chart, then the user interface section 31 will terminate the process performed by the radar chart display control unit 30. If the operation input is not an instruction to terminate the process of making a radar chart, then step S14 will be performed.

The details of a radar chart making process will now be described.

Figure 5:
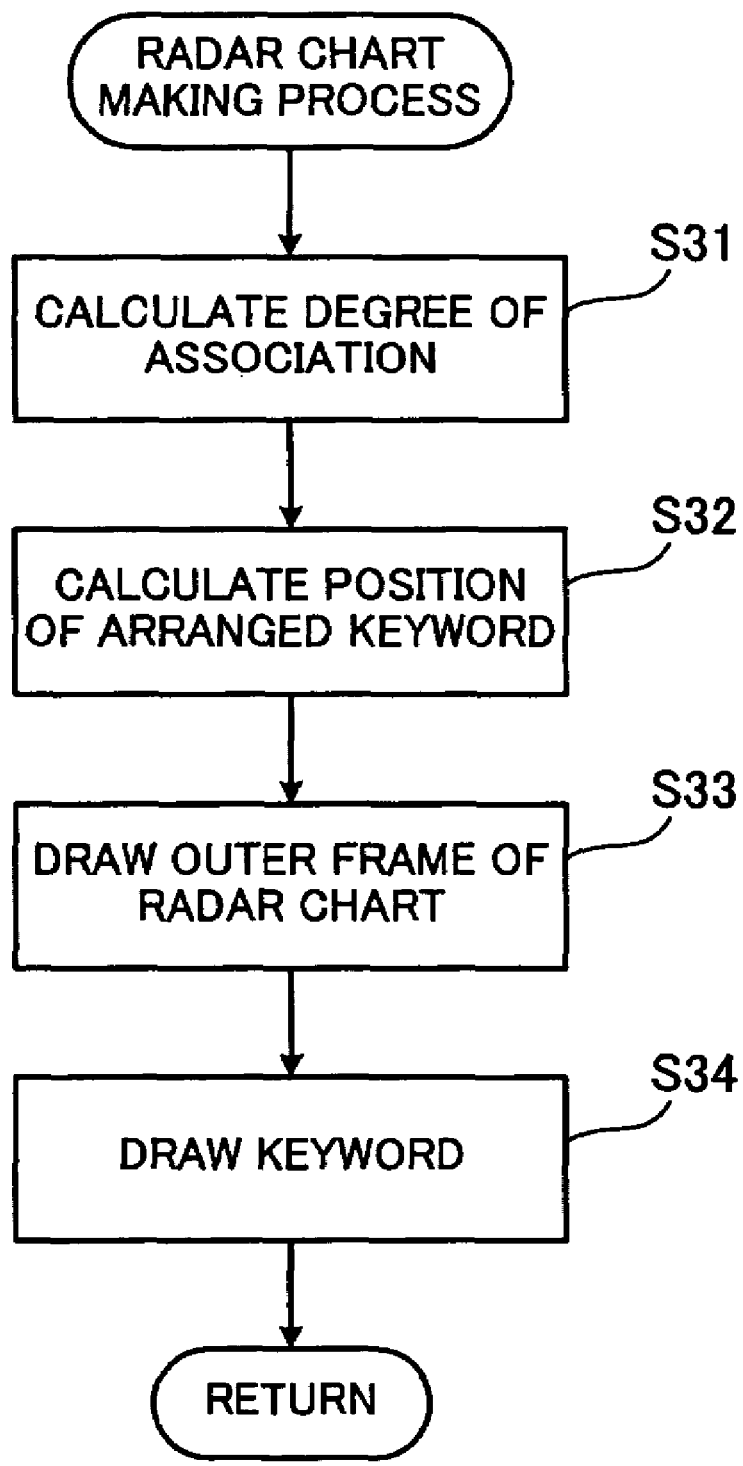
FIG. 5 is a flow chart showing in detail a radar chart making process in the first embodiment.

FIG. 5 is a flow chart showing in detail a radar chart making process in the first embodiment. The process shown in FIG. 5 will now be described in order of step number.

[Step S31] The degree-of-association judgment section 34 analyzes tabular data input from the tabular data input section 32 and calculates and judges the degree of association between an axial label and an arranged keyword about which the radar chart making condition designation section 33 informed the degree-of-association judgment section 34. The degree-of-association judgment section 34 informs the keyword position setting section 35 about the degree of association it judged.

[Step S32] The keyword position setting section 35 calculates the position of each arranged keyword on a radar chart on the basis of the degree of association between an axial label and an arranged keyword about which the degree-of-association judgment section 34 informed the keyword position setting section 35. That is to say, the keyword position setting section 35 calculates the force of a virtual spring which will act on each arranged keyword from an axial label. Then the keyword position setting section 35 adds up forces (vector values) acting in the direction of a reference point for each axial label (a vertex of the outer frame of the radar chart, for example) with the position of an arranged keyword as a point of action. The keyword position setting section 35 sets a location where the absolute value of the sum of the vectors becomes zero (where the forces are balanced) as the position of an arranged keyword. As a result, the position of an arranged keyword will be set at a location near to a reference point for an axial label the degree of association of which with the arranged keyword is high. The keyword position setting section 35 informs the drawing processing section 36 about calculation results.

[Step S33] The drawing processing section 36 draws the outer frame of the radar chart. The outer frame of the radar chart is a polygon having vertices the number of which corresponds to that of axial labels. At this time the drawing processing section 36 draws an image of a word or the like indicative of an axial label corresponding to an axis which passes a vertex of the outer frame of the radar chart near the vertex.

[Step S34] The drawing processing section 36 draws an image of a word or the like indicative of an arranged keyword at a position on the radar chart calculated by the keyword position setting section 35. Then step S14 shown in FIG. 4 will be performed.

The outer frame of a radar chart, an image of a word or the like indicative of an axial label, and an image of a word or the like indicative of an arranged keyword drawn by such a process will be displayed on the screen of the display unit 21. As a result, a radar chart based on tabular data specified by operation input by a user will be displayed.

Now, an example of the making of a radar chart in the first embodiment will be described.

FIG. 6 is a view showing a first example of tabular data input. In tabular data 41 shown in FIG. 6, the degree of the superiority of prices for products manufactured by a plurality of manufacturers is evaluated on a ten-rank basis. If products are equal in performance and quality, then a greater evaluation value will be given to a more inexpensive product and a smaller evaluation value will be given to a more expensive product. In this example, products manufactured by five manufacturers are evaluated. Therefore, the tabular data 41 shown in FIG. 6 includes one row and five columns.

The keyword "price," being an evaluation item, is set in the row of the tabular data 41. Moreover, the keywords "F Company," "N Company," "I Company," "H Company," and "T Company," being manufacturer names, are set in the five columns respectively. The evaluation value "8" is registered in the field where the Price row and the F Company column intersect. The evaluation value "5" is registered in the field where the Price row and the N Company column intersect. The evaluation value "7" is registered in the field where the Price row and the I Company column intersect. The evaluation value "8" is registered in the field where the Price row and the H Company column intersect. The evaluation value "3" is registered in the field where the Price row and the T Company column intersect.

By the way, a radar chart must have at least three axial labels. This means that if the keyword set in the row of the tabular data 41 of one row and five columns shown in FIG. 6 is used as an axial label, a radar chart cannot be made. Therefore, when the tabular data 41 is input, the degree-of-association judgment section 34 sets a keyword set in each column as an axial label and sets the keyword "price" set in the row as an arranged keyword, without waiting for an instruction from the radar chart making condition designation section 33. In addition, the degree-of-association judgment section 34 considers the evaluation value regarding "price" of each manufacturer as the degree of association between the arranged keyword "price" and each axial label.

Then the keyword position setting section 35 assigns the axial labels to five axes on a radar chart. The position of the arranged keyword is pulled from a reference point for each axial label by the force of a virtual spring.

Figure 7:
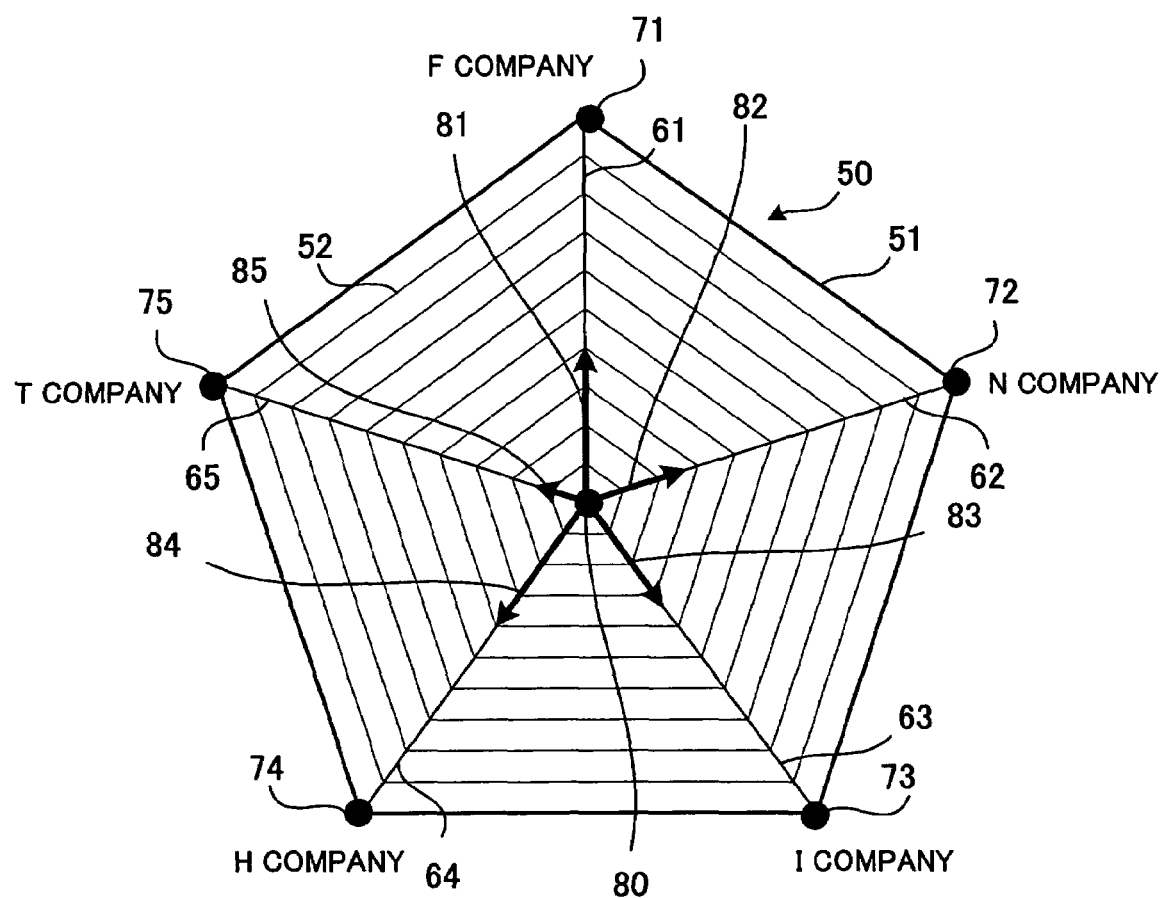
FIG. 7 is a simplified view showing the force of a virtual spring which acts at the position of an arranged keyword.

FIG. 7 is a simplified view showing the force of a virtual spring which acts at the position of an arranged keyword. On a radar chart 50 shown in FIG. 7, a pentagonal outer frame 51 is set. The axial labels "F Company," "N Company," "I Company," "H Company," and "T Company" are assigned to five axes 61 through 65, respectively, on the radar chart 50. The evaluation values regarding price in the tabular data 41 (shown in FIG. 6) are set on a ten-rank basis, so each axis is graduated on a ten-rank basis. A graduation on each axis which corresponds to zero is at the center of the radar chart 50. Additional lines 52 each of which passes the same graduation values on the axes 61 through 65 are drawn inside the outer frame 51. Positions on the axes 61 through 65 indicative of the maximum graduation value (10) correspond to reference points 71 through 75, respectively, for axial labels assigned thereto.

In this example, a display position 80 for the arranged keyword "price" is indicated at the center of the radar chart 50. Virtual spring forces 81 through 85 which act in the direction of from the display position 80 to the reference points on the axes 61 through 65, respectively, for the axial labels are defined at the display position 80. In this example, the spring force 81 with a magnitude of 8 is defined in the direction of from the display position 80 to the reference point 71 for the axial label "F Company". The spring force 82 with a magnitude of 5 is defined in the direction of from the display position 80 to the reference point 72 for the axial label "N Company". The spring force 83 with a magnitude of 7 is defined in the direction of from the display position 80 to the reference point 73 for the axial label "I Company". The spring force 84 with a magnitude of 8 is defined in the direction of from the display position 80 to the reference point 74 for the axial label "H Company". The spring force 85 with a magnitude of 3 is defined in the direction of from the display position 80 to the reference point 75 for the axial label "T Company".

In this example, a resultant force for the five spring forces 81 through 85 will act practically in the direction of the reference point 73 for the axial label "I Company" if the display position 80 is set at the center of the radar chart 50. As a result, the resultant force for the spring forces which acts at the display position 80 for the arranged keyword "price" will go into a balanced state at a location near to the reference point 73 for the axial label "I Company".

Figure 8:
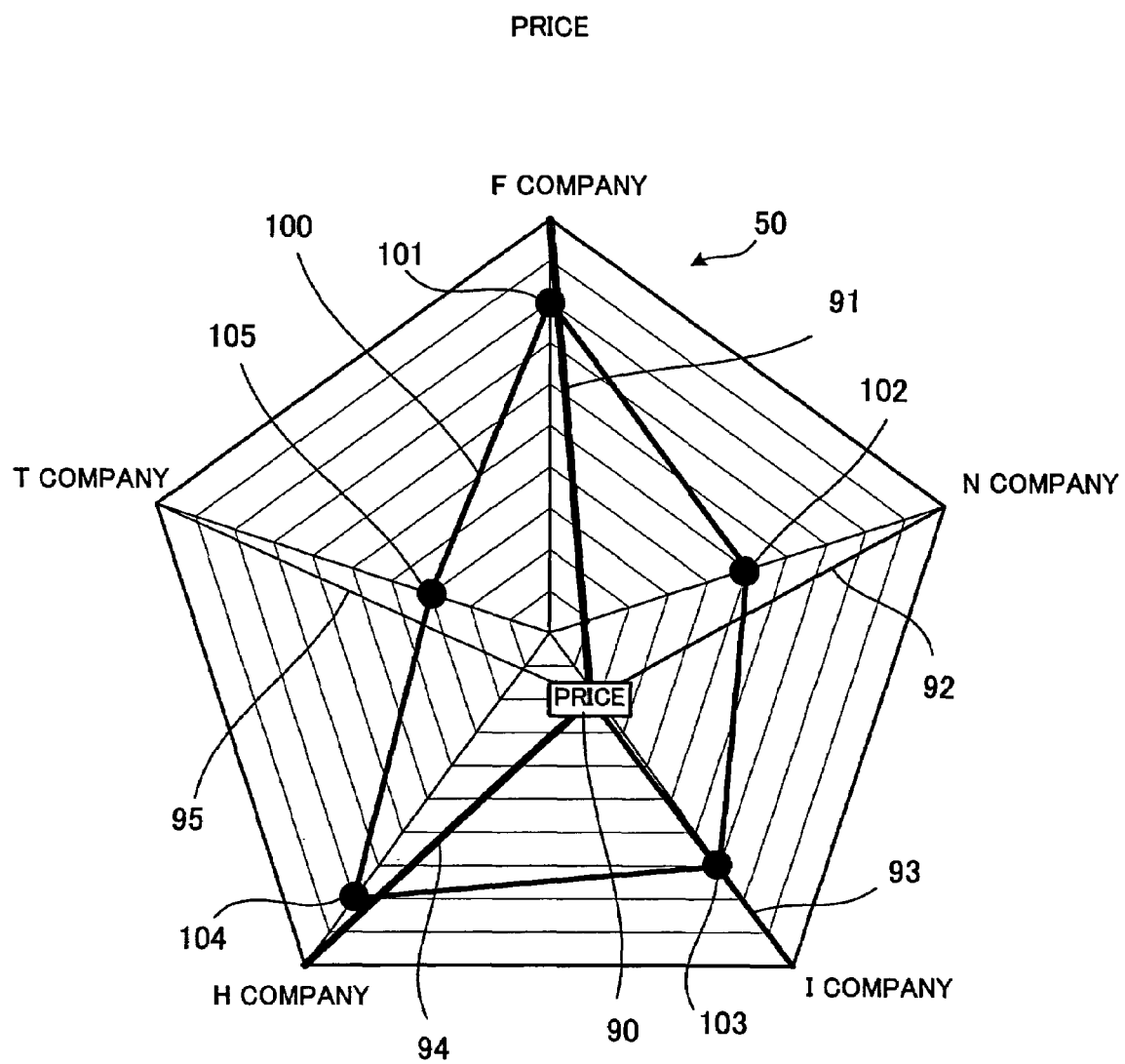
FIG. 8 is a view showing an example of a radar chart displayed on the basis of the tabular data shown in FIG. 6.

FIG. 8 is a view showing an example of a radar chart displayed on the basis of the tabular data shown in FIG. 6. On the radar chart 50 according to the first embodiment of the present invention, a word 90 indicative of an evaluation item designated as an arranged keyword is displayed. In this example, "price" is displayed as the word 90. Each of relational lines 91 through 95 connects the position where the word 90 are displayed and a reference point on an axis. Each of the relational lines 91 through 95 is a line segment which connects the display position for the arranged keyword and a reference point for an axial label. The thickness of the relational lines 91 through 95 is determined according to the degree of association between the arranged keyword and an axial label assigned to each axis. As the degree of association increases, the relational lines 91 through 95 become thicker. In this example, the relational line 91 which connects a reference point for the axial label "F Company" and the word 90 and the relational line 94 which connects a reference point for the axial label "H Company" and the word 90 are the thickest. The relational line 93 which connects a reference point for the axial label "I Company" and the word 90 is thinner than the relational lines 91 and 94. The relational line 92 which connects a reference point for the axial label "N Company" and the word 90 is thinner than the relational line 93. The relational line 95 which connects a reference point for the axial label "T Company" and the word 90 is the thinnest.

A broken line 100 indicative of the degree of association between the arranged keyword and an axial label is also drawn on the radar chart 50. That is to say, on the radar chart 50, points 101 through 105 each of which indicates the value of the degree of association between an axial label assigned to each axis and the arranged keyword are arranged on the axes respectively. The broken line 100 which passes the points 101 through 105 is drawn.

By displaying such a radar chart on the screen of the display unit 21, a user can easily grasp a statistical trend regarding an evaluation item from a position on the radar chart where the word 90 indicative of the evaluation item is displayed. In this example, the radar chart includes one evaluation item, so a trend regarding the item is indicated more comprehensibly by displaying the broken line 100 at the same time. The degree of association between the word 90 indicative of the evaluation item and each axial label is shown by the thickness of a line which connects the word 90 indicative of the evaluation item and a reference point for each axial label. Therefore, even if the broken line 100 is not displayed, values indicative of the degree of association can be compared easily.

Now, an example in which a plurality of items are used as arranged keywords will be described.

FIG. 9 is a view showing a second example of tabular data input. In this example, the degree of the superiority regarding each evaluation item of each manufacturer is evaluated on a ten-rank basis in the light of the results of a questionnaire, including a plurality of evaluation items, about impressions of manufacturers.

In this example, it is assumed that tabular data 42 of six rows and five columns is input. The keywords "price," "function," "support," "expandability," "design," and "portability" are assigned to the six rows respectively. The keywords "F Company," "N Company," "I Company," "H Company," and "T Company," being manufacturer names, are assigned to the five columns respectively.

With the evaluation item "price," evaluation values given to the F Company, N Company, I Company, H Company, and T Company are 8, 5, 7, 8, and 3 respectively. With the evaluation item "function," evaluation values given to the F Company, N Company, I Company, H Company, and T Company are 7, 4, 9, 6, and 5 respectively. With the evaluation item "support," evaluation values given to the F Company, N Company, I Company, H Company, and T Company are 10, 8, 6, 9, and 7 respectively. With the evaluation item "expandability," evaluation values given to the F Company, N Company, I Company, H Company, and T Company are 6, 9, 10, 5, and 9 respectively. With the evaluation item "design," evaluation values given to the F Company, N Company, I Company, H Company, and T Company are 5, 10, 9, 7, and 9 respectively. With the evaluation item "portability," evaluation values given to the F Company, N Company, I Company, H Company, and T Company are 7, 8, 9, 6, and 10 respectively.

First, the keywords, being manufacturer names, in the columns included in the tabular data 42 are used as axial labels and the keywords, being evaluation items, in the rows included in the tabular data 42 are used as arranged keywords.

Figure 10:
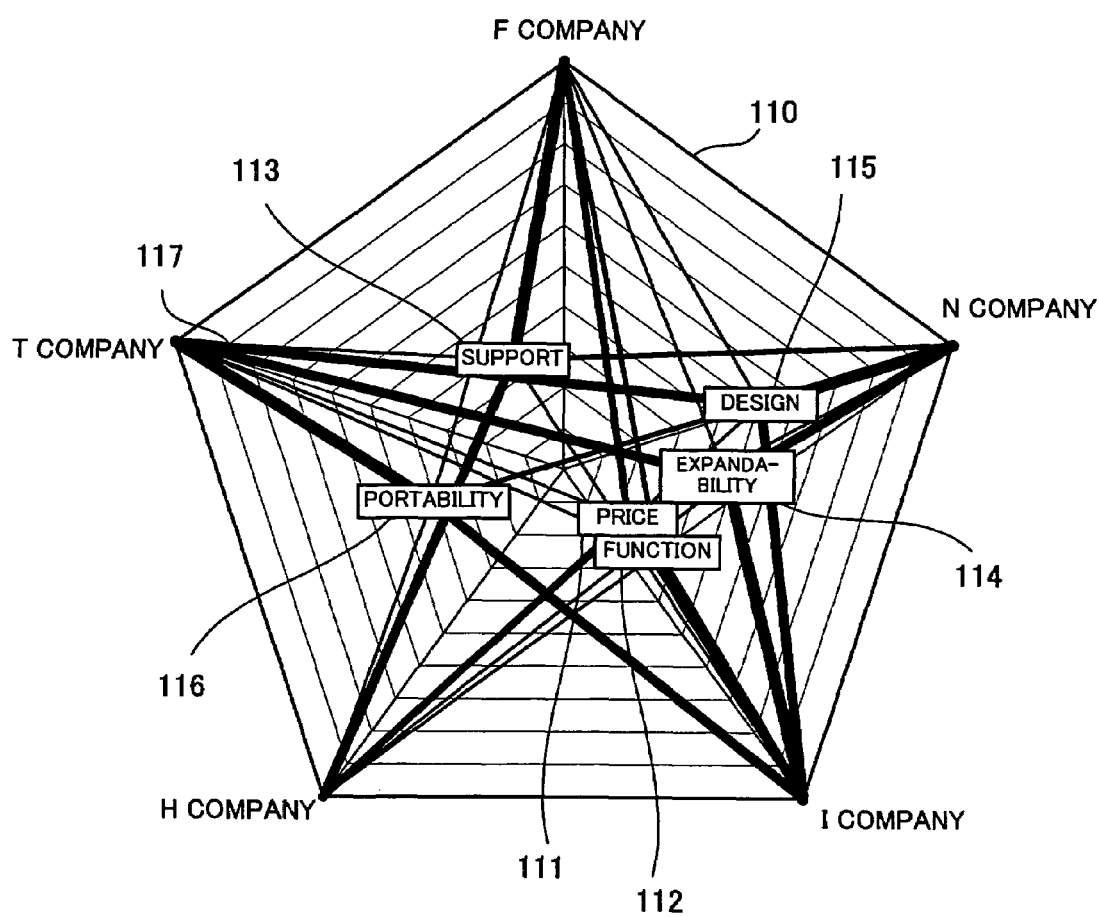
FIG. 10 is a view showing an example of a radar chart made on the basis of the tabular data shown in FIG. 9.

FIG. 10 is a view showing an example of a radar chart made on the basis of the tabular data shown in FIG. 9. As shown in FIG. 10, if a plurality of items are designated as arranged keywords, a plurality of words 111 through 116 indicative of the evaluation items will be displayed on a radar chart. As a result, statistical trends regarding the evaluation items can be compared easily by the positions where the words 111 through 116 indicative of the evaluation items are displayed. In addition, by displaying a relational line 117 between each of the words 111 through 116 indicative of the evaluation items and a reference point for each axial label, an evaluation value regarding each evaluation item given to each manufacturer can be judged by the thickness of the relational line 117.

Moreover, in the first embodiment, by specifying an arbitrary evaluation item by operation input from a user, a radar chart of only this item can be made. For example, on a screen on which a radar chart 110 shown in FIG. 10 is displayed, the word "price" 111 should be specified with a mouse pointer or the like. By doing so, the radar chart 50 (shown in FIG. 8) on which only the word "price" is used as an arranged keyword will be displayed on the screen.

Furthermore, with the radar chart display control unit 30 according to the first embodiment, axial labels can be replaced with arranged keywords and the arranged keywords can be replaced with the axial labels, in response to operation input from a user. If operation input is provided in a state in which the radar chart 110 shown in FIG. 10 is being displayed to replace the axial labels with the arranged keywords and to replace the arranged keywords with the axial labels, then the name of an evaluation item set in each row in the tabular data shown in FIG. 9 will be used as an axial label and the name of a manufacturer set in each column in the tabular data shown in FIG. 9 will be used as an arranged keyword.

Figure 11:
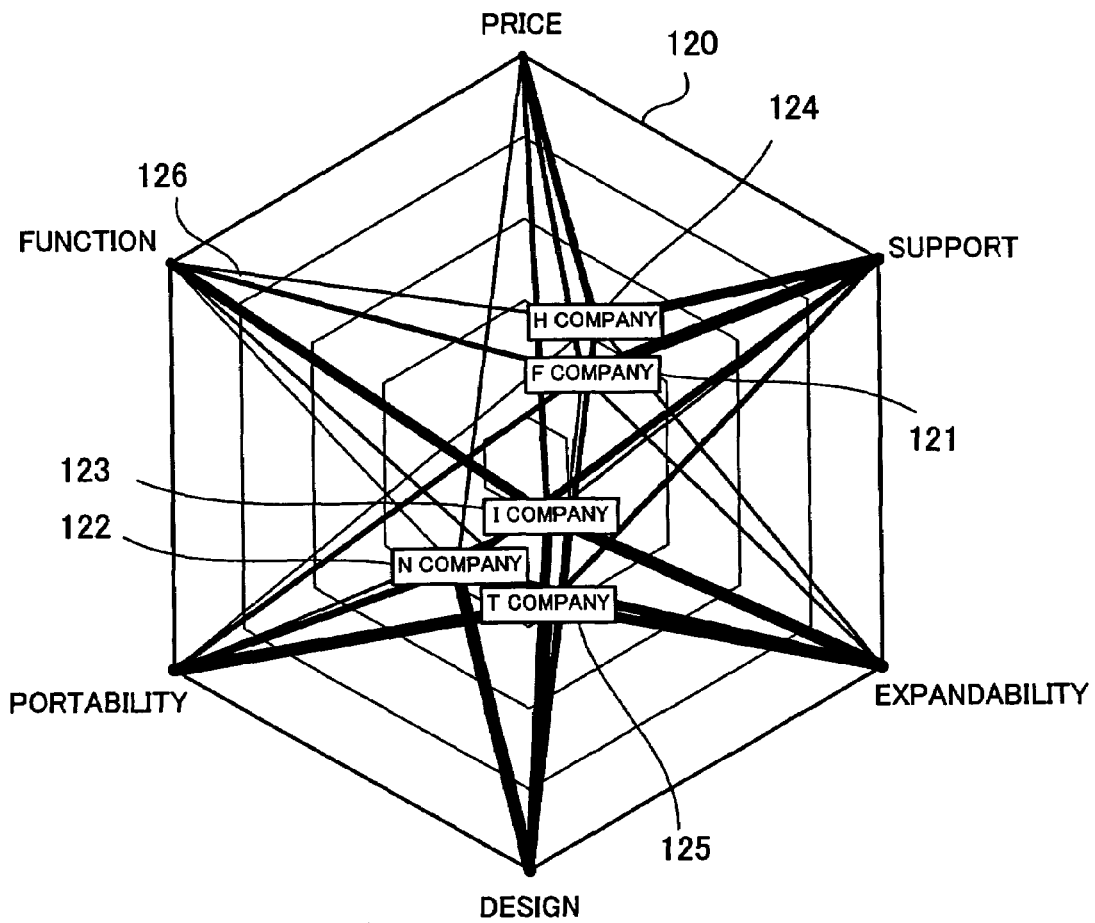
FIG. 11 is a view showing an example of a radar chart displayed after replacing the axial labels with the arranged keywords and replacing the arranged keywords with the axial labels.

FIG. 11 is a view showing an example of a radar chart displayed after replacing the axial labels with the arranged keywords and replacing the arranged keywords with the axial labels. On a radar chart 120 shown in FIG. 1, the items "price," "support," "expandability," "design," "portability," and "function" are assigned to six axes, respectively, as axial labels. Manufacturer names "F Company" 121, "N Company" 122, "I Company" 123, "H Company" 124, and "T Company" 125 are displayed on the radar chart 120. In this example, each manufacturer name and a reference point on each axis are connected by a relational line 126. The evaluation value (degree of association) regarding each evaluation item (axial label) of each manufacturer name (arranged keyword) is indicated by the thickness of the relational line 126.

As stated above, a radar chart can be made easily from another viewpoint by replacing axial labels with arranged keywords and replacing the arranged keywords with the axial labels. This will reduce time or labor required to analyze data.

Second Embodiment

The second embodiment will now be described. In the first embodiment, a radar chart is made by receiving tabular data input. In the second embodiment, however, a radar chart is made by receiving a plurality of pieces of text data input. The differences between the first and second embodiments will now be described.

Components of the processing function of a radar chart display control unit in the second embodiment are the same as those of the processing function of the radar chart display control unit in the first embodiment shown in FIG. 3. Therefore, the function of the radar chart display control unit in the second embodiment will be described by the use of the symbols with which the components shown in FIG. 3 are marked. Moreover, the radar chart display control unit in the second embodiment can be realized with a computer the hardware configuration of which is the same as that shown in FIG. 2.

Except for the inputting of tabular data (step S11 in FIG. 4) and the making of a radar chart (step S13 in FIG. 4), the entire flow of a process in the second embodiment is the same as that of the process in the first embodiment shown in FIG. 4.

With a tabular data input process, keyword association will be performed. To perform keyword association, keywords according to parts of speech are quarried from a group of documents through a morphological analysis. Then the degree of the importance of the keywords quarried, the degree of association between keywords, the degree of association between a keyword and a document, and the like are calculated. Keyword association means such a mining process regarding keywords etc.

Figure 12:
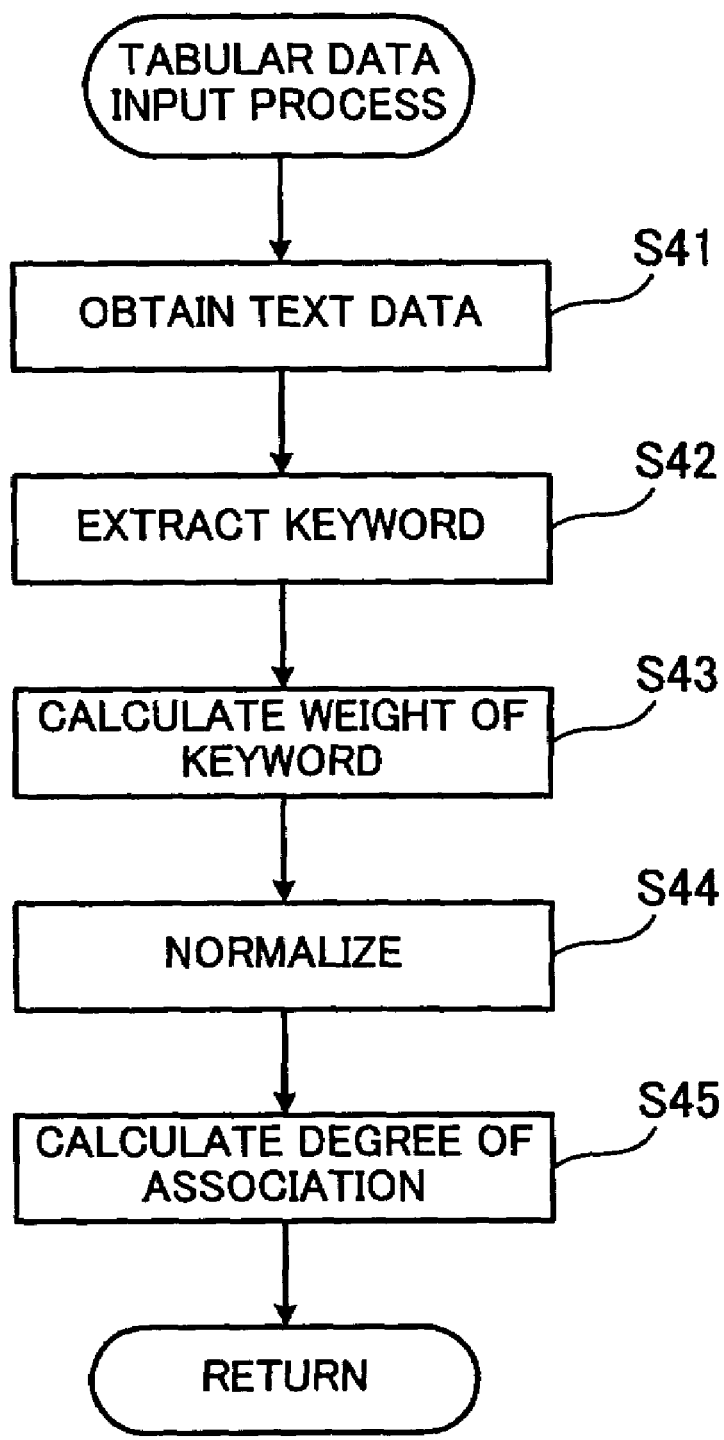
FIG. 12 is a flow chart showing a tabular data input process in a second embodiment.

FIG. 12 is a flow chart showing a tabular data input process in the second embodiment. The process shown in FIG. 12 will now be described in order of step number.

[Step S41] When a user interface section 31 receives operation input regarding text input from a user, the user interface section 31 informs a tabular data input section 32 about the contents of an instruction corresponding to the operation input. The tabular data input section 32 obtains one or more pieces of text data in response to the contents of the instruction from the user interface section 31. For example, the tabular data input section 32 obtains text data input by a user with a keyboard 22 or the like. Alternatively, the tabular data input section 32 can obtain a group of pieces of text data stored in advance in an HDD 13 or the like from it.

[Step S42] The tabular data input section 32 extracts keywords from each piece of text data it obtained. For example, the tabular data input section 32 carries out a morphological analysis of text data it obtained to extract keywords included in it. Alternatively, the tabular data input section 32 can search each piece of text data for keywords to be extracted specified in advance and obtain keywords detected.

[Step S43] The tabular data input section 32 calculates the weight of each keyword. Weight is a value obtained by statistically calculating the importance in text of a keyword. In the second embodiment, Kullback information will be used as weight. Kullback information is a value regarding frequency and variations in the appearance of a keyword in text. That is to say, the weight of a keyword which appears frequently in text is set to a great value. However, the weight of a keyword, such as a postpositional word functioning as an auxiliary to a main word or a conjunction, which appears anywhere uniformly and frequently is calculated so that it will be a small value.

The weight ($S_{ij}$) of a jth keyword in an ith text is given by $$S_{ij} = p(w/t) \cdot \log\{p(w/t)/P(w)\} \quad (1)$$

where p (w/t) is the probability of a keyword w appearing in a text t (which is one analysis unit and which corresponds to a record where one questionnaire is registered in the case of questionnaire data) and P(w) is the probability of the keyword w appearing in all texts.

The weight of each keyword extracted in step S42 will be calculated in this way.

[Step S44] The tabular data input section 32 normalizes the weight of each keyword to one. That is to say, in step S43 the weight in a plurality of texts of a keyword is calculated. Therefore, the weight of a keyword can be expressed as a vector (keyword vector) in text space with texts as coordinate axes (the number of which corresponds to that of the texts). The tabular data input section 32 normalizes a keyword vector in text space to a unit vector with a length of 1.

[Step S45] The tabular data input section 32 calculates the degree of association between two keywords. The degree of association is calculated on the basis of a correlation between the keywords. To be concrete, the inner product of vectors obtained by normalizing the two keywords is set as the degree of association between the two keywords. If the inner product is a positive value, then each of the two keywords can be considered to have a relationship to the other. If the inner product is a negative value, then each of the two keywords can be considered to have no relationship to the other.

Data indicative of degree of association between the keywords is sent to a degree-of-association judgment section 34 as tabular data.

Figure 13:
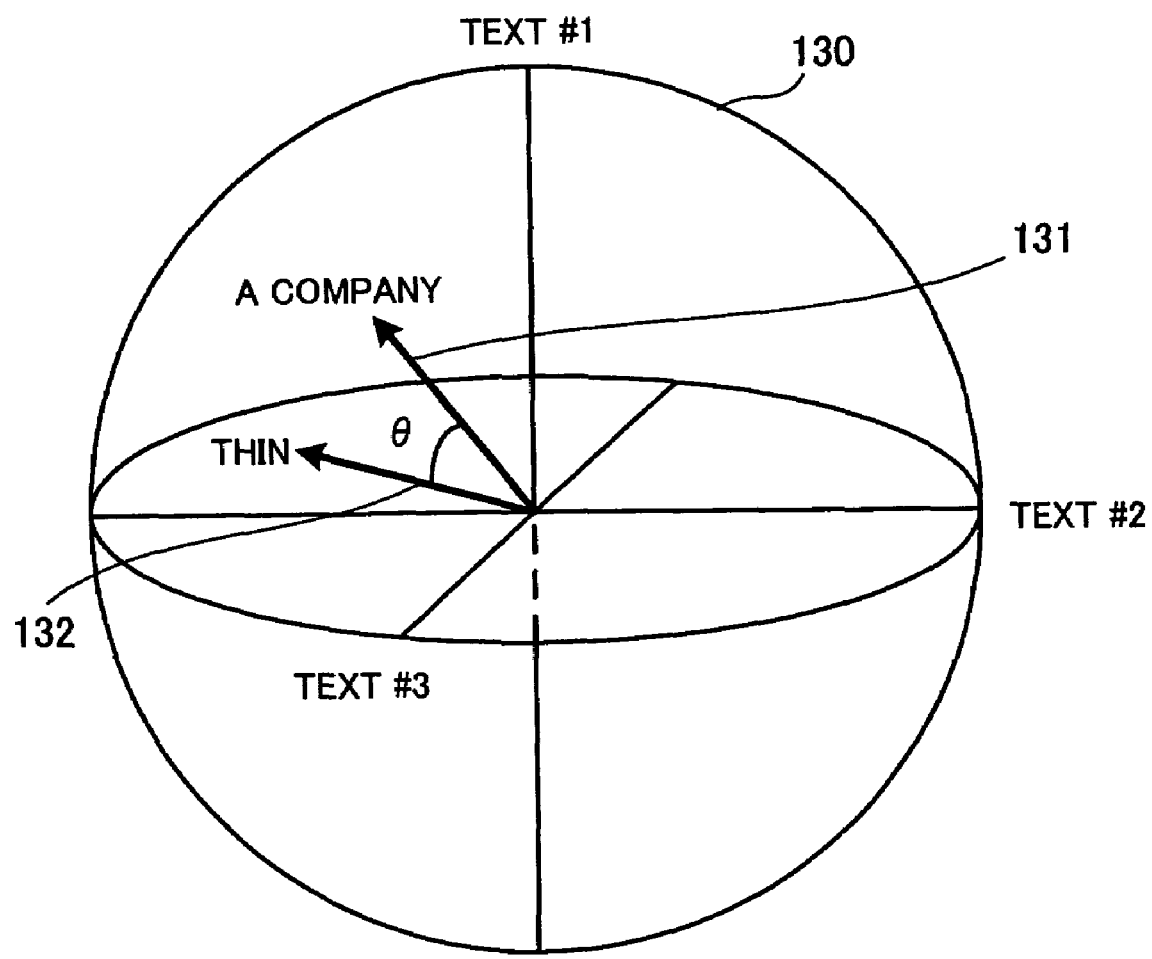
FIG. 13 is a simplified view for describing the degree of association between keywords.

FIG. 13 is a simplified view for describing the degree of association between keywords. Axes according to text attributes are arranged in text space 130. In this example, the text space 130 is three-dimensional space including three axes corresponding to three texts (texts #1, #2, and #3).

A keyword vector 131 (which is a unit vector with a length of 1) corresponding to the keyword "A Company" and a keyword vector 132 (which is a unit vector with a length of 1) corresponding to the keyword "thin" are defined in the text space 130. As an angle θ between the two keyword vectors 131 and 132 decreases, the degree of association between the keywords increases. The tabular data input section 32 calculates the inner product of the two keyword vectors 131 and 132 and considers a value obtained as the degree of association between the keyword "A Company" and the keyword "thin".

For example, the more frequently the text "computers manufactured by the A Company are thin" appears, the smaller the angle θ between the keyword vector 131 corresponding to the keyword "A Company" and the keyword vector 132 corresponding to the keyword "thin" becomes. That is to say, the degree of association between the keyword "A Company" and the keyword "thin" increases.

A radar chart making process performed in the second embodiment will now be described.

Figure 14:
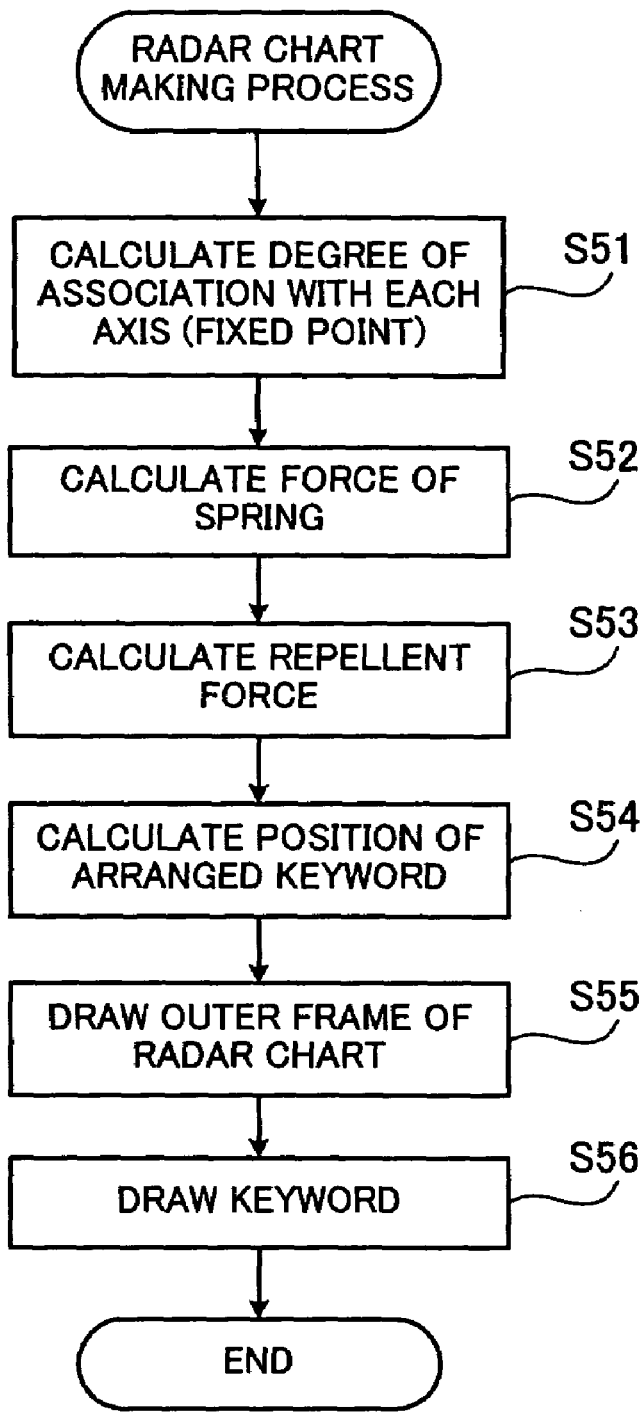
FIG. 14 is a flow chart showing the procedure for a radar chart making process in the second embodiment.

FIG. 14 is a flow chart showing the procedure for a radar chart making process in the second embodiment. The process shown in FIG. 14 will now be described in order of step number.

[Step S51] The degree-of-association judgment section 34 selects a keyword to be used as an axial label in conformity with an instruction from a radar chart making condition designation section 33. Then the degree-of-association judgment section 34 judges the degree of association between the keyword selected as an axial label and another keyword. The degree of association calculated by the tabular data input section 32 can be used as the degree of association between the axial label and another keyword.

[Step S52] The keyword position setting section 35 calculates the force of a spring. Conceptually, a spring force is defined between a reference point on each axis and an arranged keyword on a radar chart and the arranged keyword is pulled in the direction of each axis by a spring force. Then the arranged keyword will shift in the direction from which a strong force acts. If the degree of association between the arranged keyword and an axial label is a negative value (if the inner product of two keyword vectors corresponding to the arranged keyword and an axial label respectively is negative), then they will be considered to be independent of each other and a spring force will not be-set.

A spring force F can be calculated by the formula:

$$F = C_s \cdot \log(d/d_0) \quad (2)$$

where $C_s$ (real number) is a coefficient of strength and corresponds to, for example, the degree of association in the second embodiment, d (positive real number) is the length of a spring and corresponds to, for example, the distance between a reference point for an axial label and the position of the arranged keyword in the second embodiment (the distance between any two adjacent graduations marked on an axis corresponds to unit length, for example), and $d_0$ (positive real number) is the natural length of the spring, that is to say, the length of the spring being not in an expanded or compressed state.

[Step S53] The keyword position setting section 35 calculates a repellent force (repulsive force) which acts between the arranged keyword and an axial label independent of the arranged keyword. A repellent force is the one which acts between keywords not connected by a spring.

A repellent force $F_r$ can be expressed by the formula:

$$F_r = C_r \cdot (1/d^n) \quad (3)$$

where $C_r$ (real number) is a coefficient of strength for a repellent force and n (real number) is an exponent set in advance.

As stated above, a spring force or a repellent force will act on the arranged keyword from a reference point for each axial label.

[Step S54] The keyword position setting section 35 runs the physical simulation of the forces (spring forces and repellent forces) calculated in steps S52 and S53 acting on each arranged keyword. Then the keyword position setting section 35 determines the position where a resultant force for the forces acting on each arranged keyword becomes zero.

[Step S55] The drawing processing section 36 draws the outer frame of the radar chart.

[Step S56] The drawing processing section 36 draws an image (letters or the like) indicative of each arranged keyword at the position determined in step S54.

Figure 15:
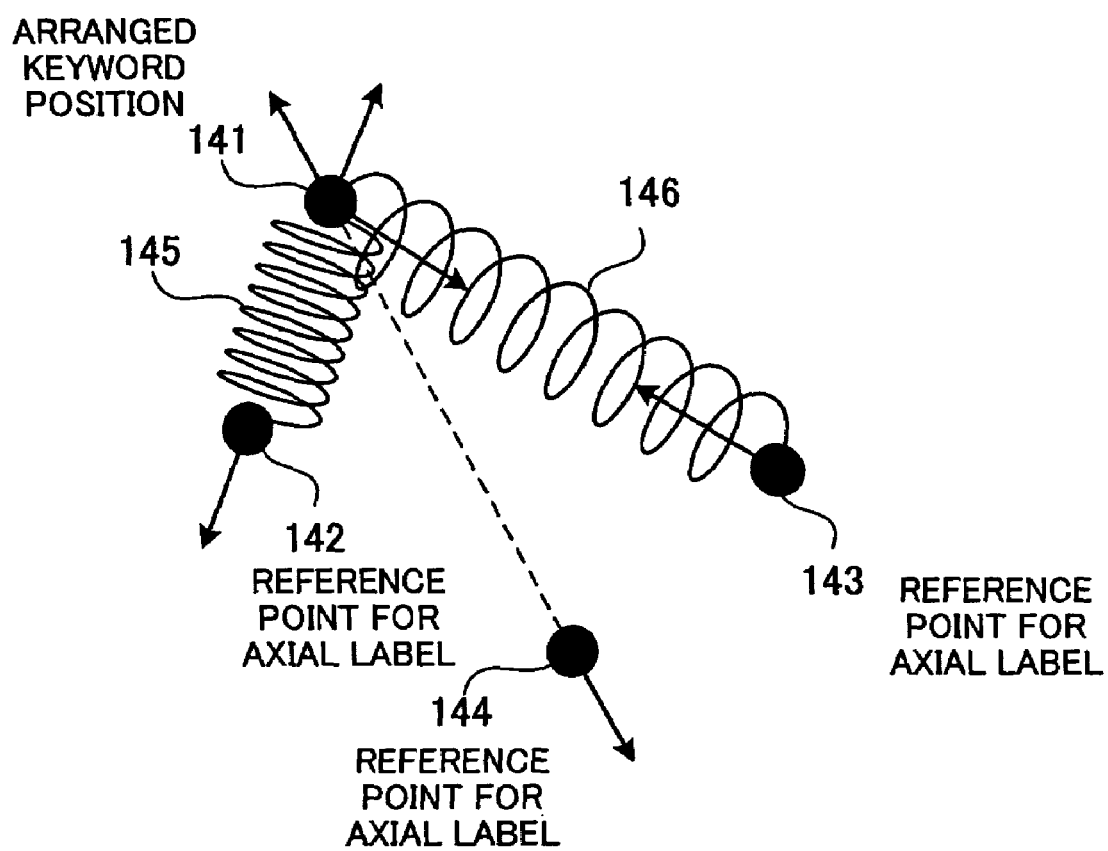
FIG. 15 is a simplified view showing relationships among forces acting between keywords.

FIG. 15 is a simplified view showing relationships among forces acting between keywords. In FIG. 15, a force acting at the position of each keyword is indicated by an arrow. In FIG. 15, forces acting at an arranged keyword position 141 from reference points 142 through 144 for axial labels are shown. A spring 145 is defined between the arranged keyword position 141 and the reference point 142 for the axial label. In this example, it is assumed that the length of the spring 145 is shorter than the natural length. Then the spring 145 will generate a force which makes the arranged keyword position 141 more distant from the reference point 142 for the axial label.

A spring 146 is defined between the arranged keyword position 141 and the reference point 143 for the axial label. In this example, it is assumed that the length of the spring 146 is longer than the natural length. Then the spring 146 will generate a force which makes the arranged keyword position 141 nearer to the reference point 143 for the axial label.

A spring is not defined between the arranged keyword position 141 and the reference point 144 for the axial label. Therefore, a repellent force which makes the arranged keyword position 141 more distant from the reference point 144 for the axial label will be generated between them.

The spring model described in the second embodiment is called the Eades spring model. According to the Eades spring model, a strong force will act in a spring in a compressed state to expand it. By contrast, however, a force which will act in a spring in an expanded state to compress it is weak. In addition, a repellent force will be strong when the distance between two objects is short. That is to say, the Eades spring model has characteristics which will disperse keywords.

An example of making a radar chart according to the second embodiment will now be described.

FIG. 16 is a view showing an example of text data input. In this example, the results of a questionnaire about evaluations of computer manufacturers are provided as text data 43. The text data 43 includes a Manufacturer column and an Opinion column. In the text data 43, the sentence "Computers are user-friendly." has been registered as an opinion about the A Company. The sentence "A support setup is complete." has been registered as an opinion about the B Company. The sentence "There are-many pieces of pre-installed software." has been registered as an opinion about the C Company. The sentence "Designs are good." has been registered as another opinion about the A Company.

When the text data 43 is input to the radar chart display control unit 30, a radar chart will be made. A keyword association process will be performed on a combination of a manufacturer name and the contents of an opinion, which is considered as one text.

Figure 17:
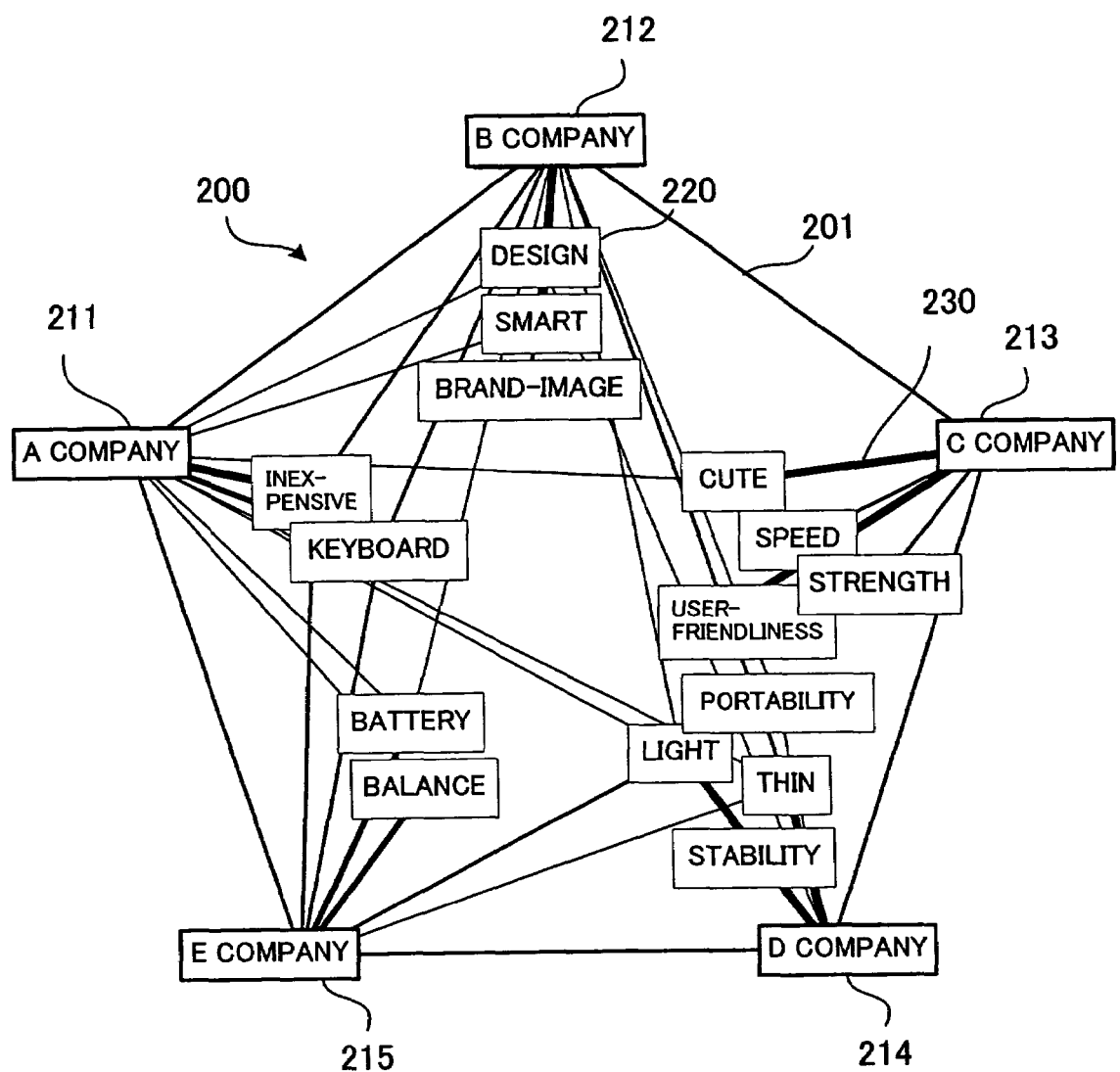
FIG. 17 is a view showing an example of a radar chart made on the basis of text data.
Figure 19:
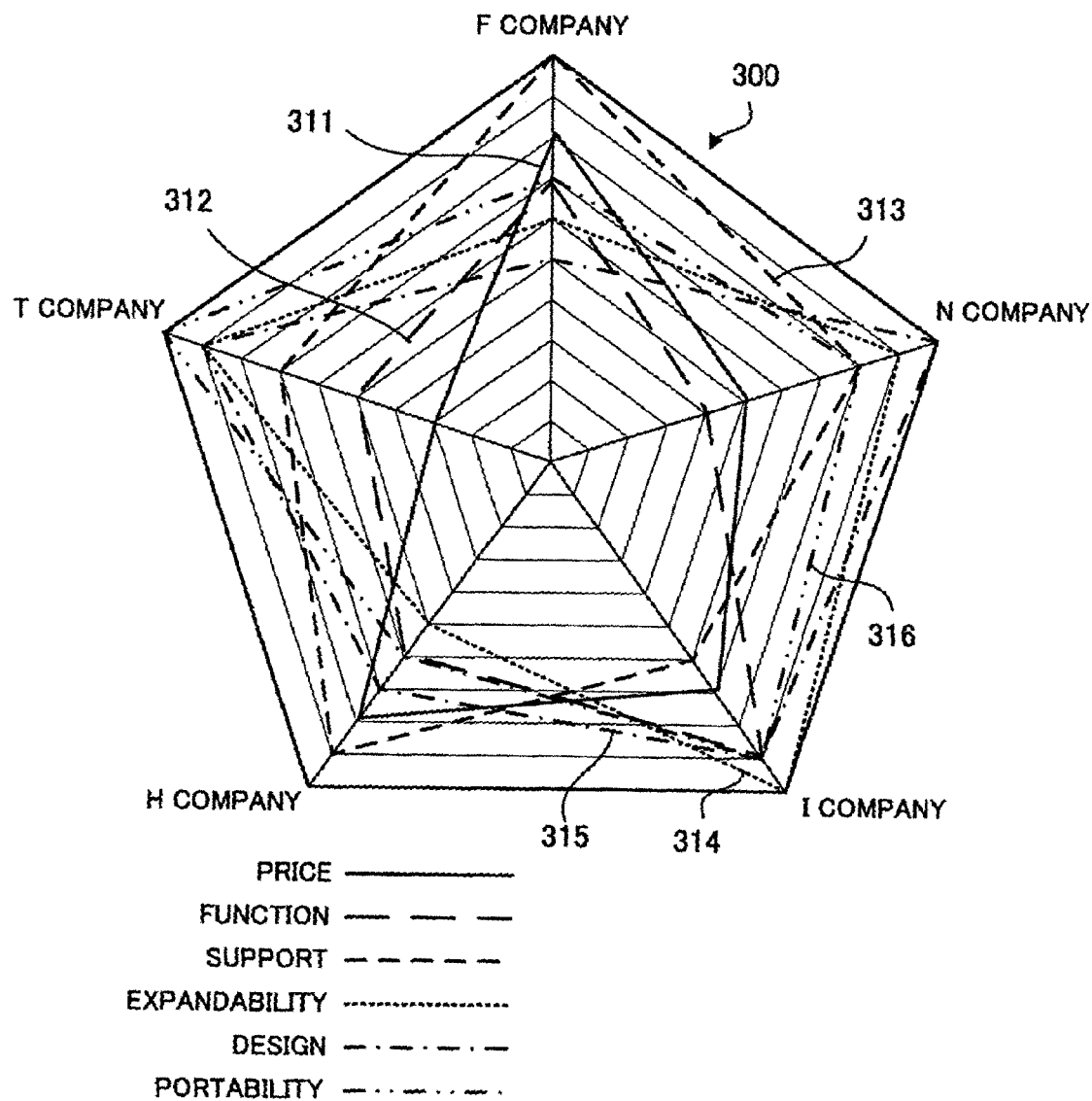
FIG. 19 is a view showing an example of a radar chart on which a plurality of broken lines are displayed.
Figure 20:
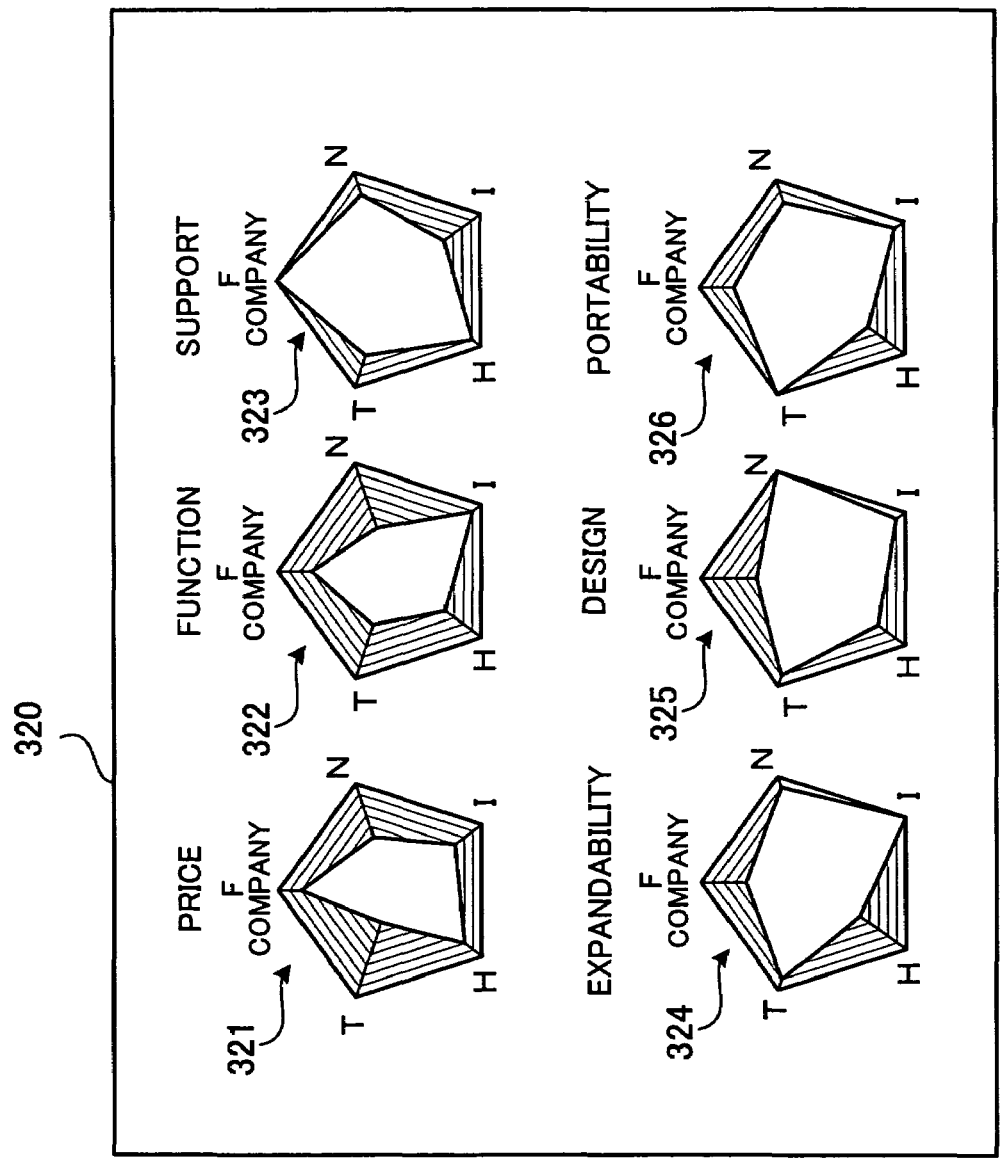
FIG. 20 is a view showing an example of a screen on which a plurality of radar charts are displayed.

FIG. 17 is a view showing an example of a radar chart made on the basis of text data. As shown in FIG. 17, a polygonal outer frame 201 is drawn on a radar chart 200. In this example, there are five axes, so the outer frame 201 has the shape of a regular pentagon.

Axial labels 211 through 215 are arranged at the vertices of the outer frame 201. In this example, the keywords "A Company," "B Company," "C Company," "D Company," and "E Company" are selected as the axial labels 211 through 215 respectively. A plurality of keywords 220 set as arranged keywords are arranged at positions on the radar chart 200 which correspond to the degree of association with the axial labels 211 through 215. Moreover, each keyword and an axial label which has a relationship to it are connected by a relational line 230. Each keyword is drawn by a spring force in the direction of an axial label to which it is connected by the relational line 230. In addition, a repellent force acts on each keyword from an axial label to which it is not connected by the relational line 230. As a result, each of the plurality of keywords 220 will be arranged at a position on the radar chart 200 near to an axial label with which the degree of association is high. Therefore, the statistical results of a questionnaire can be displayed visually and simply.

Application of the Embodiment

The Eades spring model is a technique for arranging relationship well and finely on a two-dimensional plane (a chart on which keywords are arranged is referred to as an arrangement map) to display the entire relationship. By adjusting the coefficients included in the formulas used in this spring model for calculating a spring force and a repellent force, characteristic keyword maps can be made.

FIG. 18 is a view showing the relationship between an algorithm and coefficients. In this example, three algorithms are assumed.

With an algorithm 1-1, strength ($C_s$) and natural length ($d_0$) included in spring characteristics are both constants. A feature of the algorithm 1-1 is that it has the same characteristics as the Eades spring model. The degree of association can be shown by the thickness of a relational line. A characteristic of an arrangement map based on this algorithm is that it tends to spread.

With an algorithm 1-R, strength ($C_s$) included in the spring characteristics corresponds to the degree of association and natural length ($d_0$) included in the spring characteristics is a constant. Features of the algorithm 1-R are that a stronger force will act between keywords between which the degree of association is higher and that the spread of an arrangement map is restrained slightly. A characteristic of keywords on an arrangement map is that if similar relationships exist among many keywords, they tend to gather in the center.

With an algorithm R-R, strength ($C_s$) included in the spring characteristics corresponds to the degree of association and natural length ($d_0$) included in the spring characteristics corresponds to the inverse number of the degree of association (1/degree of association). Features of the algorithm R-R are that a stronger force will act between keywords between which the degree of association is higher, that the spread of an arrangement map is restrained slightly, and that keywords have a strong tendency to form a cluster. A characteristic of keywords on an arrangement map is that if similar relationships exist among many keywords, they gather in the center.

By using these algorithms at the same time, the best arrangement can be obtained. For example, keywords among which the degree of association is high are gathered first by the algorithm R-R. With this state as the initial one, keywords among which the degree of association is low are dispersed by the algorithm 1-R. As a result, a radar chart on which the arrangement of keywords will make it easy to judge whether the degree of association is high or low can be obtained.

Furthermore, by changing the value of the exponent n used for calculating a repellent force, a radar chart on which arrangement makes the relationship between an axial label and an arranged keyword clearer can be obtained.

For example, it is assumed that the value of n is great. When the positions of a plurality of arranged keywords are calculated, a force which acts between an arranged keyword and an axial label independent of the arranged keyword will weaken. This will make the effect of an arranged keyword being pulled by a plurality of axial labels to each of which the arranged keyword has a relationship striking. Accordingly, a keyword will be arranged at a position which makes an axial label to which it has a close relationship clear.

Moreover, in the above first and second embodiments, an arranged keyword is drawn in the direction of an axial label to which it has a closer relationship as a result of being pulled in the direction of a reference point on each axis. By using another method, however, an arranged keyword can be drawn in the direction of an axial label to which it has a closer relationship. For example, a broken line indicative of the properties of an arranged keyword is calculated and the center of gravity of a figure enclosed by the broken line may be set as the position of the arranged keyword.

As has been described in the foregoing, in the first and second embodiments of the present invention, a keyword is displayed at a position near to a reference point on an axis to which it has a close relationship. Therefore, a user will easily see which axial label a keyword has a close relationship to.

Moreover, the degree of association between a keyword and an axial label is indicated by the thickness of a relational line which connects the position of the keyword and a reference point for the axial label. The degree of association between a keyword and each axial label can be displayed on a radar chart without using a broken line.

Furthermore, if a plurality of items are displayed on a radar chart, broken lines are not displayed and only an image (letters, for example) of each keyword is displayed. This improves visibility shown when a plurality of items are displayed at the same time. If a plurality of items can be displayed on one radar chart in an easy-to-see manner, items can be compared easily and analysis time can be shortened.

In addition, axial labels can be replaced with keywords (arranged keywords) displayed on a radar chart and the arranged keywords can be replaced with the axial labels. Therefore, analyses can be made quickly from different points of view.

Moreover, by selecting one of a plurality of items displayed on a radar chart, a radar chart on which only that item is displayed will appear. Therefore, after grasping the outline of an arrangement map regarding a plurality of keywords, a user can display the details of it with a radar chart including a broken line. As a result, when a user makes an analysis of data regarding a plurality of items, he/she can grasp the outline and details of it quickly.

Furthermore, radar chart results obtained by the use of a keyword arrangement map can be output as a file. Therefore, analysis results can be utilized effectively by another piece of application software. This means that radar chart results obtained by the use of a keyword arrangement map can be utilized in various business situations, such as in the case of presentation.

The above functions can be realized with a computer. In this case, a program in which the contents of the functions the radar chart display control unit should have are described is provided. By executing this program on a computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disc (DVD), a compact disc read only memory (CD-ROM), or the like. A magneto-optical recording medium can be a compact disc recordable (CD-R)/rewritable (CD-RW), a digital versatile disc random access memory (DVD-RAM), a magneto-optical disc (MO), or the like.

To place the program on the market, portable record media, such as DVDs or CD-ROMs, on which it is recorded are sold. Alternatively, the program is stored in advance on a hard disk in a server computer and is transferred to another computer via a network.

When a computer executes this program, it will store the program, which is recorded on a portable record medium or which is transferred from a server computer, on, for example, its hard disk. Then it reads the program from its hard disk and performs processes in compliance with the program. A computer can also read the program directly from a portable record medium and perform processes in compliance with the program. Furthermore, each time the program is transferred from a server computer, a computer can perform processes in turn in compliance with the program it received.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for displaying a radar chart on the screen of a display unit, the program causing a computer to execute:

judging a degree of association between each of a plurality of axial labels and at least one arranged keyword on the basis of data indicative of the relationship between each of the plurality of axial labels and the arranged keyword;

assigning the plurality of axial labels to a plurality of axes on a radar chart and setting a reference point for the assigned axial label on each of the plurality of axes;

automatically setting a display position for the arranged keyword at a location nearer to a reference point for an axial label the degree of association of which with the arranged keyword is relatively high than to a reference point for an axial label the degree of association of which with the arranged keyword is relatively low; and displaying an image indicative of the arranged keyword at the display position set on the radar chart, wherein a virtual spring force, which changes according to distance, is defined between a display position for the arranged keyword and a reference point for an axial label to which the arranged keyword has a relationship, a location, where spring forces acting at the display position for the arranged keyword are balanced, is set as a display position for the arranged keyword, and as the degree of association between the arranged keyword and the axial label increases, the virtual spring force becomes stronger.

2. The computer-readable medium according to claim 1, wherein a line segment which connects the image indicative of the arranged keyword and a reference point for each of the plurality of axial labels is displayed in a thickness corresponding to a degree of association between the arranged keyword and each of the plurality of axial labels.

3. The computer-readable medium according to claim 1, wherein if there are a plurality of arranged keywords, an image indicative of each of the plurality of arranged keywords is displayed on one radar chart.

4. The computer-readable medium according to claim 3, further causing a computer to execute remaking a radar chart on which only a selected image is to be displayed in response to operation input for selecting the image provided while the radar chart on which the images indicative of the plurality of arranged keywords are shown is being displayed.

5. The computer-readable medium according to claim 4, wherein if a radar chart on which only the selected image is to be displayed is remade, a broken line indicative of the characteristics of an arranged keyword indicated by the selected image is displayed on the newly made radar chart.

6. The computer-readable medium according to claim 1, further causing a computer to execute remaking a radar chart on which the axial labels have been replaced with the arranged keywords and on which the arranged keywords have been replaced with the axial labels by the use of original tabular data for the radar chart being displayed in response to operation input provided while the radar chart is being displayed.

7. The computer-readable medium according to claim 1, wherein a virtual repellent force is defined between the display position for the arranged keyword and a reference point for an axial label to which the arranged keyword has no relationship, further wherein a location where all the spring and repellent forces acting at the position for the arranged keyword are balanced is set as a display position for the arranged keyword.

8. The computer-readable medium according to claim 1, further causing a computer to execute:

extracting keywords included in a plurality of pieces of text data and calculating the degree of association between the extracted keywords; and judging a degree of association between each of axial labels and an arranged keyword by specifying the axial labels and the arranged keyword from among the extracted keywords.

9. The computer-readable medium according to claim 1, further causing a computer to execute generating data from which the contents of a displayed radar chart can be reproduced and outputting the generated data in response to operation input.

10. A method for displaying a radar chart on a computer screen, the method comprising the steps of:

judging a degree of association between each of a plurality of axial labels and at least one arranged keyword on the basis of data indicative of the relationship between each of the plurality of axial labels and the arranged keyword;

assigning the plurality of axial labels to a plurality of axes on a radar chart and setting a reference point for the assigned axial label on each of the plurality of axes;

automatically setting a display position for the arranged keyword at a location nearer to a reference point for an axial label the degree of association of which with the arranged keyword is relatively high than to a reference point for an axial label the degree of association of which with the arranged keyword is relatively low; and displaying an image indicative of the arranged keyword at the display position set on the radar chart, wherein a virtual spring force, which changes according to distance, is defined between a display position for the arranged keyword and a reference point for an axial label to which the arranged keyword has a relationship, a location, where spring forces acting at the display position for the arranged keyword are balanced, is set as a display position for the arranged keyword, and as the degree of association between the arranged keyword and the axial label increases, the virtual spring force becomes stronger.

11. An apparatus displaying a radar chart on a screen, said apparatus comprising:

a controller, judging a degree of association between each of a plurality of axial labels and at least one arranged keyword on the basis of data indicative of the relationship between each of the plurality of axial labels and the arranged keyword;

assigning the plurality of axial labels to a plurality of axes on a radar chart and for setting a reference point for the assigned axial label on each of the plurality of axes;

automatically setting a display position for the arranged keyword at a location nearer to a reference point for an axial label the degree of association of which is judged to be relatively high than to a reference point for an axial label the degree of association of which is judged to be relatively low; and a screen displaying an image indicative of the arranged keyword at the set display position, wherein a virtual spring force, which changes according to distance, is defined between a display position for the arranged keyword and a reference point for an axial label to which the arranged keyword has a relationship, a location, where spring forces acting at the display position for the arranged keyword are balanced, is set as a display position for the arranged keyword, and as the degree of association between the arranged keyword and the axial label increases, the virtual spring force becomes stronger.

12. The computer-readable medium according to claim 1, wherein a natural length of a spring which is origin of the virtual spring force, corresponds to an inverse number of the degree of association.

* * * * *